US010141754B2

(12) United States Patent
Ha

(10) Patent No.: US 10,141,754 B2
(45) Date of Patent: Nov. 27, 2018

(54) INTEGRATION OF BATTERY MANAGEMENT SYSTEM AND BATTERY CHARGER

(71) Applicant: Robert Bosch GmbH, Stuttgart (DE)

(72) Inventor: Pham Ngoc Ha, Sydney (AU)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/527,389

(22) PCT Filed: May 21, 2015

(86) PCT No.: PCT/IB2015/053729
§ 371 (c)(1),
(2) Date: May 17, 2017

(87) PCT Pub. No.: WO2016/185253
PCT Pub. Date: Nov. 24, 2016

(65) Prior Publication Data
US 2017/0331303 A1    Nov. 16, 2017

(51) Int. Cl.
*H02J 7/00* (2006.01)
(52) U.S. Cl.
CPC .......... *H02J 7/0026* (2013.01); *H02J 7/0022* (2013.01); *H02J 7/0045* (2013.01); *H02J 2007/0096* (2013.01)
(58) Field of Classification Search
CPC .................................................... H02J 7/0026
(Continued)

(56) References Cited

U.S. PATENT DOCUMENTS 5,283,511 A * 2/1994 Keener ................ H02J 7/0006
                                                                320/106
5,701,068 A    12/1997 Baer et al.
(Continued)

FOREIGN PATENT DOCUMENTS

CN    203205896 U    9/2013
JP    2011259572 A    12/2011

OTHER PUBLICATIONS

International Search Report dated Feb. 29, 2016, of the corresponding International Application PCT/IB2015/053729 filed May 21, 2015.

*Primary Examiner* — Suresh Memula
(74) *Attorney, Agent, or Firm* — Norton Rose Fulbright US LLP; Gerard Messina

(57) ABSTRACT

A battery module, including at least one battery unit, a transistor unit, and a battery management unit. The battery unit provides a power supply electrical current. The transistor unit is provided for serving as a switch for the battery unit and it a switch gate node, a first switch current node, and a second switch current node. The power supply electrical current passes through the first switch current node and the second switch current node when a predetermined transistor on-state voltage is applied to the switch gate node. The power supply electrical current is blocked front passing through the first switch current node and the second switch current node when a predetermined transistor off-state voltage is applied to the switch gate node. The battery management unit comprises a processor being connected to the switch gate node. The transistor unit further serves as an electrical current sensor.

9 Claims, 16 Drawing Sheets

(58) Field of Classification Search
USPC .......................................................... 320/112
See application file for complete search history.

(56) References Cited

U.S. PATENT DOCUMENTS

| | | | | |
|---|---|---|---|---|
| 6,184,660 | B1* | 2/2001 | Hatular | H02J 7/022 |
| | | | | 320/139 |
| 8,143,860 | B2 | 3/2012 | Gangsto et al. | |
| 8,450,977 | B2* | 5/2013 | Niculae | H02M 1/08 |
| | | | | 320/134 |
| 2011/0133555 | A1 | 6/2011 | Choi | |
| 2011/0304299 | A1 | 12/2011 | Yang et al. | |
| 2012/0170157 | A1 | 7/2012 | Holsen et al. | |
| 2013/0221926 | A1 | 8/2013 | Furtner | |
| 2014/0184140 | A1* | 7/2014 | Lee | H02J 7/0054 |
| | | | | 320/103 |
| 2014/0203761 | A1* | 7/2014 | Paparrizos | H02M 3/1582 |
| | | | | 320/107 |
| 2015/0380959 | A1* | 12/2015 | Chang | H02J 7/0019 |
| | | | | 320/118 |

* cited by examiner

FIG. 2  "BATTERY DISCHARGING MODE"

FIG. 3 "BATTERY CHARGING MODE"

INTEGRATION OF BATTERY MANAGEMENT SYSTEM AND BATTERY CHARGER

FIELD

The present invention relates to battery management and charging.

BACKGROUND INFORMATION

Different modules for charging a battery and for protecting of the battery during the charging are available.

U.S. Pat. No. 8,143,860 B2 describes a battery controller for use in a portable device. The battery controller has a battery management system, which has cell-balancing field effect transistors that are coupled to a data bus. The management system is provided in a single chip device to reduce cost.

U.S. Patent Application Publication No. 2012/0170157 A1 describes a battery management and protection system for, as an example, a lithium-ion battery of a portable device. The battery management and protection system has a controller. During a start-up of the battery management and protection system, the controller is adapted to load safety values or load calibration parameters automatically from a non-volatile memory to registers. The system acts to improve reliability of battery management by use of adaptive control methods.

U.S. Pat. No. 5,701,068 describes a battery management system for management and control of a plurality of rechargeable batteries, which are connected in series. The battery management system includes a programmed central processing unit that communicates with a plurality of battery modules and a bulk charger.

Each of the battery modules includes a rechargeable battery, a sensor node, and a direct current charger. The sensor node comprises a plurality of battery sensors, and a microcontroller that processes signals generated by the battery sensors.

During a charging cycle, the bulk charger provides a variable bulk charging current to the rechargeable batteries. Each of the rechargeable batteries receives a charging current from individual direct current charger, which is positioned at the respective rechargeable battery.

The voltage and temperature of the rechargeable batteries are also monitored by the programmed central processing unit by means of the sensor nodes. The bulk charging current is reduced to one-half when any battery voltage reaches a predetermined clamping voltage. Once the bulk charging current is reduced to approximately 1 to 2 percent of the 3-hour discharge capacity for the rechargeable batteries, the bulk charger is turned off and the direct current chargers have finished each battery charge independently.

SUMMARY

It is an object of the present invention to provide an improved battery management device with an improved battery-charging device.

The present invention provides an improved battery module. An example battery module in accordance with the present invention includes at least one battery unit, a transistor unit, and a battery management unit. The battery unit acts a rechargeable energy storage unit. The transistor unit acts a switch for the battery unit and as current sensor resistor for the battery management unit.

The example battery module provides an advantage of reducing components since the transistor unit serves as both a circuit breaker and a sensor resistor. The reduced components act to reduce cost and reduce energy consumption.

DETAILED DESCRIPTION OF EXAMPLE EMBODIMENTS

Below, details are provided to describe example embodiments of the application. It shall be apparent to one skilled in the art, however, that the embodiments may be practiced without such details.

Some parts of the embodiments have similar parts. The similar parts may have the same names or similar part numbers. The description of one similar part also applies by reference to another similar parts, where appropriate, thereby reducing repetition of text without limiting the disclosure.

The embodiments described below provide a Battery Management System (BMS) for a battery module.

The BMS includes one or more Metal-Oxide-Semiconductor Field-Effect Transistors (MOSFETs). The MOSFETs serve as a circuit breaker to protect the battery module against over-voltage, under-voltage, and over-current.

This BMS has a distinguishing feature in that the MOSFETs also serve as a resistor for sensing an electrical current that flows through the battery module.

The MOSFETs provide a benefit of reducing components since the MOSFETs act as both circuit breaker and sensor resistor. The MOSFETs also acts to reduce energy consumed by the BMS because charge and discharge current from the battery flows directly the MOSFETs, which has reduced components.

The embodiments also provide a Battery Management System (BMS) and a battery charger for a battery module. The BMS and the battery charger include a boost converter. The boost converter acts to increase level of voltage being applied to the battery module. The boost converter also acts to protect the battery module against over-voltage, under-voltage, and over-current.

In other words, this BMS and the battery charger do not need other circuitry, such protection MOSFETs, for protecting against over-voltage, under-voltage, and over-current.

The above BMS and battery charger can be used in a mobile energy storage system, such as an automotive battery (AE) or be used in a stationary energy storage system, such as a Photovoltaic Home Energy Storage System (BPTE).

Figure 1:
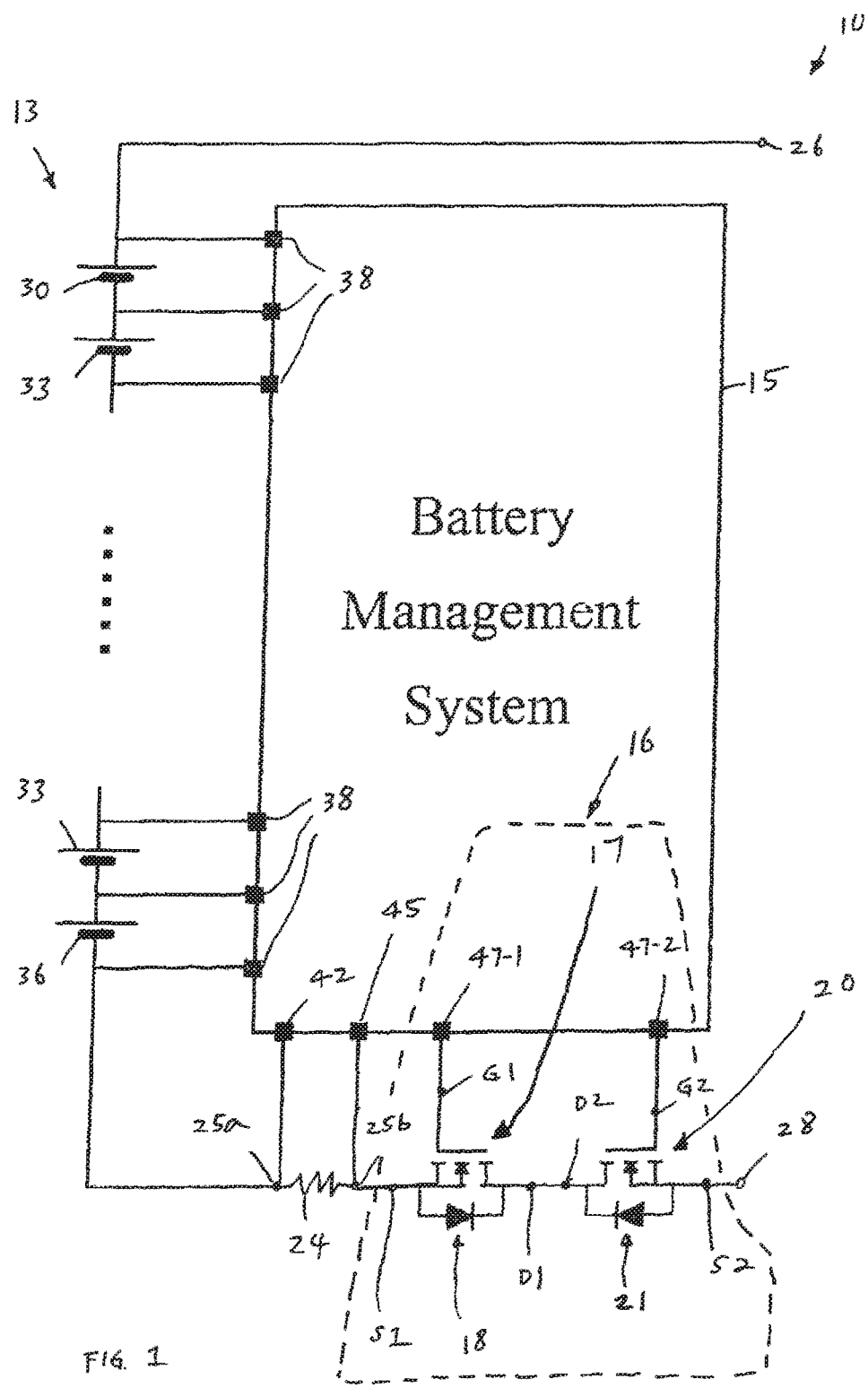
FIG. 1 illustrates a battery module that comprises a Battery Management System (BMS) with two protection MOSFETs and a current sensor resistor.

FIG. 1 shows a battery module 10.

The battery module 10 includes a plurality of battery cells 13, a Battery Management System (BMS) 15, a circuit breaker 16, and a current sensor resistor 24.

The battery cells 13 are electrically connected to the current sensor resistor 24 and to the BMS 15. The current sensor resistor 24 is electrically connected to the circuit breaker 16 and to the BMS 15. The circuit breaker 16 is electrically connected to the BMS 15.

In detail, the battery cells are electrically connected in series, is described below. The battery cells 13 comprise a first-end battery cell 30, one or more intermediate battery cells 33, and a second-end battery cell 36.

Each of the battery cells 30, 33, and 36 has a positive terminal and a negative terminal.

The positive terminal of the first-end battery cell 30 is electrically connected to a cell voltage terminal 38 of the BMS 15 and to a first load terminal 26. The first load terminal 26 is also called a positive voltage terminal. The negative terminal of the first-end battery cell 30 is electrically connected to a cell voltage terminal 38 of the BMS 15 and to a positive terminal of an intermediate battery cell 33.

The positive terminal of the intermediate battery cell 33 is electrically connected to a cell voltage terminal 38 of the BMS 15 and to a negative terminal of one of the battery cells 33. The negative terminal of the intermediate battery cell 33 is electrically connected to a cell voltage terminal 38 of the BMS 15 and to a positive terminal of one of the battery cells 13.

The positive terminal of the second-end battery cell 36 is electrically connected to a cell voltage terminal 38 of the BMS 15 and to a negative terminal of an intermediate battery cell 33. The negative terminal of the second-end battery cell 36 is electrically connected to a cell voltage terminal 38 of the BMS 15.

Referring to the sensor resistor 24, it has a first node 25a and a second node 25b. The first node 25a is electrically connected to a first current sense terminal 42 of the BMS 15 and to the negative terminal of the second-end battery cell 36.

The second node 25b is electrically connected to a second current sense terminal 45 of the BMS 15.

Referring to the circuit breaker 16, it has a battery-discharging protection MOSFET 17 with a protection body diode 18 and a battery-charging protection MOSFET 20 with a protection body diode 21.

The diode 18 is an intrinsic part of the protection MOSFET 17. In other words, the diode 18 and the protection MOSFET 17 are present physically as one device. Similarly, the protection diode 21 is an intrinsic part of the protection MOSFET 20.

The MOSFET 17 has agate terminal G1, a drain terminal D1, and a source terminal S1. The gate terminal G1 is electrically connected to a gate driver terminal 47-1 of the BMS 15. The source terminal S1 is electrically connected to the second node 25b of the sensor resistor 24 and is electrically connected to an anode A1 of the diode 18. The drain terminal D1 is electrically connected to a cathode C1 of the diode 18.

Similarly, the MOSFET 20 has a gate terminal G2, a drain terminal D2, and a source terminal S2. The gate terminal G2 is electrically connected to a gate driver terminal 47-2 of the BMS 15. The drain terminal D2 is electrically connected to the drain terminal D1 of the MOSFET 17 and to a cathode C2 of the diode 21. The source terminal S2 is electrically connected to a load terminal 28 and to an anode A2 of the diode 21.

The load terminal 28 is also called a negative voltage terminal.

In use, the battery cells 13 are intended for storing electrical energy.

The battery cells 13 can provide an electrical current for transferring electrical energy to an electrical load 1. The battery cells 13 can also be damaged when it has an under-voltage. The under-voltage refers to an excessive low voltage, which indicates an excessive or deep discharge of energy from the battery cells 13.

The battery cells 13 can also receive an electrical current for receiving electrical energy from an external energy source. The energy source can damage the battery cells 13 when the energy source applies an over-voltage or an over-current to the battery cells 13. The over-voltage refers to an excessively high voltage. The over-current refers to an excessively high electrical current.

Referring to the sensor resistor 24, it allows the BMS 15 to measure an electrical current that flows through the battery cells 13. The electrical current, which also flows through sensor resistor 24, generates a potential difference between these nodes 25a and 25b of the sensor resistor 24.

The first current sense terminal 42 and the second current sense terminal 45 of the BMS 15 then sense or receive the potential difference between the nodes 25a and 25b.

The BMS 15 then measures a potential difference between the first current sense terminal 42 and the second current sense terminal 45. The BMS 15 later computes an electrical current that flows through the battery cells 13, according to the measured potential difference. After this, the BMS 15 compares the computed electrical current against a pre-determined overcurrent value to determine whether an over-current of the battery cells 13 has occurred.

Referring to the BMS 15, the cell voltage terminals 38 sense or receive voltages of the battery cells 13. The BMS 15 then measures voltages of the cell voltage terminals 38 and computes voltages of the battery cells 13 according to the measured voltages. Following this, the BMS 15 compares the computed voltages against a pre-determined over-voltage value to determine whether an over-voltage of the battery cells 13 has occurred. The BMS 15 also compares the computed voltages of the battery cells 13 against a pre-determined under-voltage value to determine whether an under-voltage of the battery cells 13 has occurred.

Referring to the Circuit breaker 16, the protection MOSFET 17, it provides two states, namely an on-state and an off-state. The state of the MOSFET 17 is determined according to a voltage that is applied to the gate terminal G1 of the protection MOSFET 17.

In the on-state, an electrical current is allowed to flow between the source terminal S1 and the drain terminal D1 of the MOSFET 17. In the off-state, an electrical current is blocked from flowing between said source terminal S1 and said drain terminal D1 of the MOSFET 17.

The protection MOSFET 20, it has functions similar to the functions of the protection MOSFET 17, wherein the above description for the MOSFET 20 applies to the MOSFET 17.

In a normal operating mode, the diode 18 allows an electrical current to pass from its anode D1 to its cathode C1 and blocks an electrical from passing from its cathode C1 to its anode A1.

When the MOSFET 17 is in the on-state, a majority of electrical current usually flows through the MOSFET 17, and not flow through the diode 18. This is because voltage drop across the MOSFET 17 is lower than a threshold voltage of the body diode 18.

In a special case, the electrical current is very high. This causes the voltage across the MOSFET 17 to reach the threshold voltage of the diode 18 and the electrical current can flow through the diode 18.

The diodes 18 and 21 have similar functions.

The battery module 10 provides a battery-charging mode and a battery-discharging mode. The battery-discharging mode is also called an operational mode.

Figure 2:
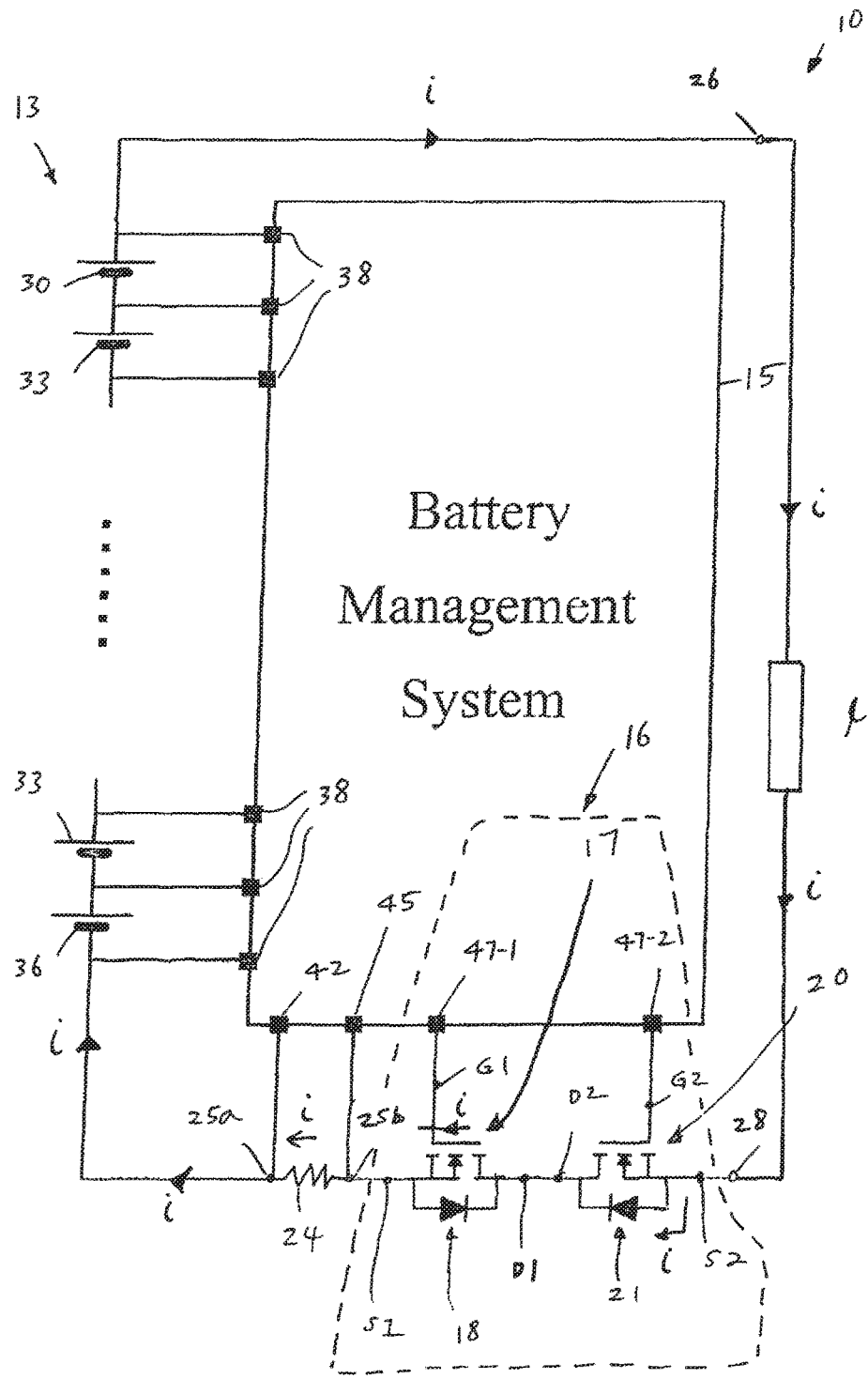
FIG. 2 illustrates a current flow of the battery module of FIG. 1, when the battery module is a battery-discharging mode.

FIG. 2 shows a current flow of the battery module 10, when the battery module 10 is the battery-discharging mode.

In the battery-discharging mode, the load terminals 26 and 28 are electrically connected to an electrical load 1. Examples of the electrical load 1 include an electrical circuit of a vehicle or an electrical circuit of a home electrical appliance.

Electrical energy is later transferred from the battery cells 13 to the electrical load 1 for providing electrical energy to the electrical load 1. A discharging electrical current i flows from the battery cells 13 to the electrical load 1, through the diode 21, through the discharging protection MOSFET 17, and through the sensor resistor 24.

When the BMS 15 detects an under-voltage of the battery cells 13, the BMS 15 protects the battery cells 13 against the under-voltage.

The BMS 15 applies a pre-determined voltage to the gate driver terminal 47-1. The gate driver terminal 47-1 then transmits or applies said voltage to the gate terminal G1 of the discharging protection MOSFET 17. The discharging protection MOSFET 17 then changes to the off-state, which acts to stop either flow of electrical current i through the discharging protection MOSFET 17. This causes the flow of electrical current i from the battery cells 13 to cease, thereby protecting the battery cells from the under-voltage.

Figure 3:
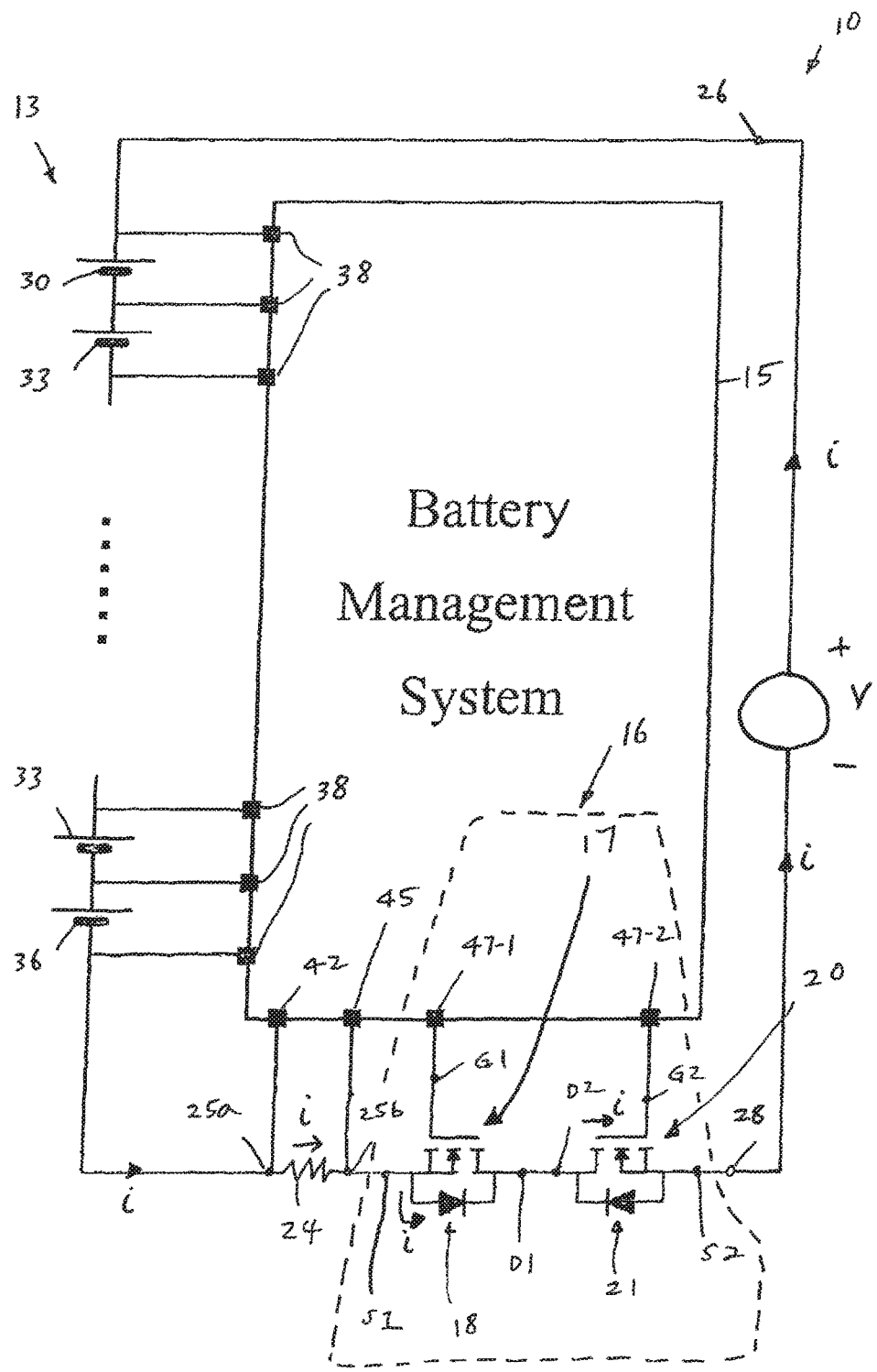
FIG. 3 illustrates a current flow of the battery module of FIG. 1, when the battery module is a battery-charging mode.

FIG. 3 depicts a current flow of the battery module of FIG. 1, when the battery module is the battery-charging mode.

In the battery-charging mode, the load terminals 26 and 28 are electrically connected to an electrical power source V.

Electrical energy is then transferred from the electrical power source V to the battery cells 13 for charging the battery cells 13. A charging electrical current i flows from the electrical power source V to the battery cells 13, through the sensor resistor 24, through the diode 18, and through the MOSFET 21.

When the BMS 15 detects an over-voltage or an over-current of the battery cells 13, the BMS 15 protects the battery cells 13 against the over-voltage or the over-current.

The BMS 15 applies a pre-determined voltage to the gate driver terminal 47-2. The gate driver terminal 47-2 then transmits or applies said voltage to the gate terminal G2 of the charging protection MOSFET 20. The charging protection MOSFET 20 then changes to the off-state, which acts to stop flow of the electrical current through the charging protection MOSFET 20. The over-voltage or the over-current of the battery cells 13 then ceases.

Different further embodiments of the BMS are possible.

In a special embodiment, the BMS 15 is implemented at one side of a semiconductor Chip to reduce cost of implementing the BMS 15.

In another embodiment, the reliability of the BMS 15 is improved by using adaptive control.

In a further embodiment, a small integrated DC to DC converter is included in the electrical circuitry of the BMS to improve control of a State Of Charge (SOC) of the battery module.

Figure 4:
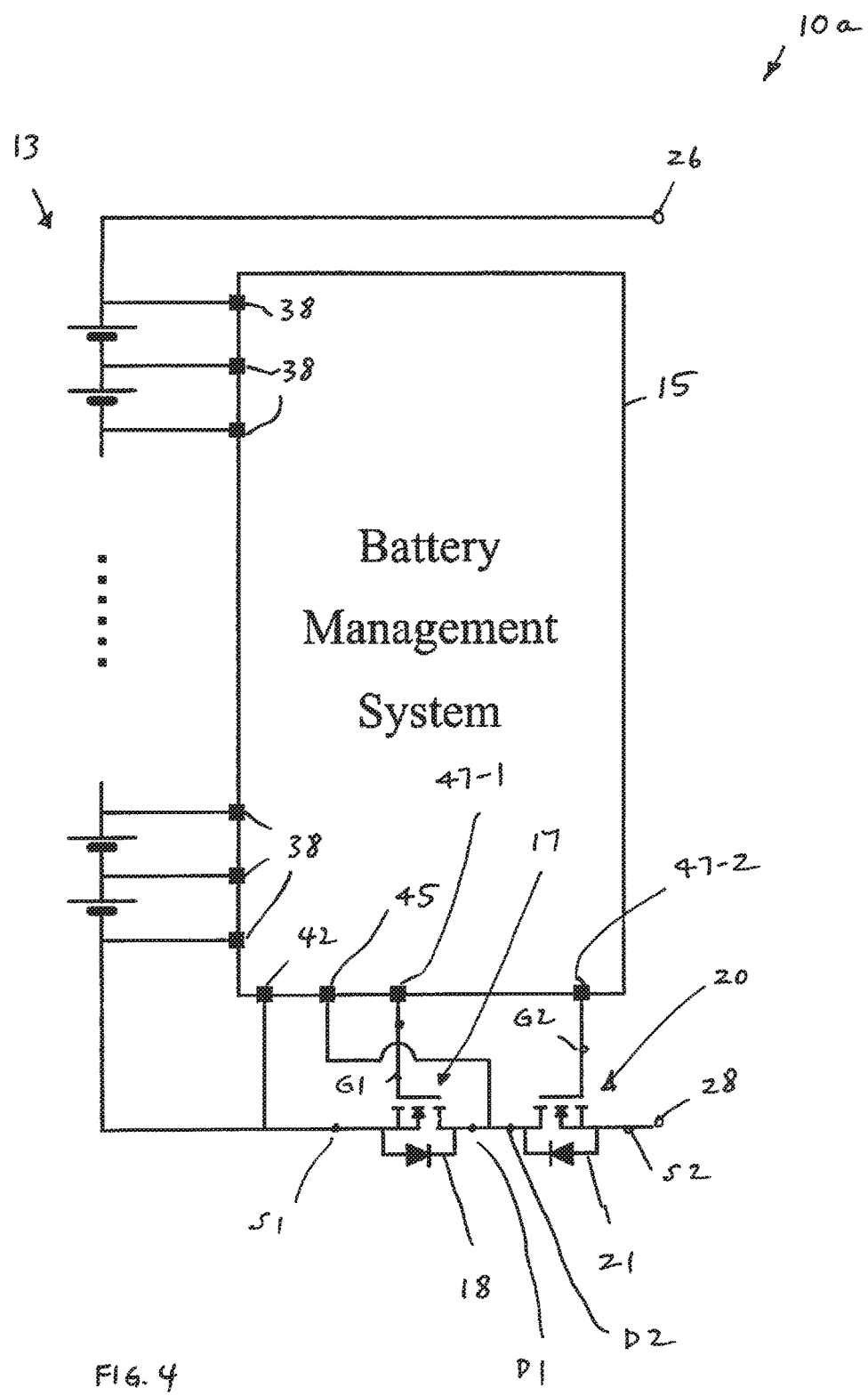
FIG. 4 illustrates an improved battery module that includes a Battery Management System (BMS) with two protection MOSFETs, one protection MOSFET also acts as a current sensor resistor.

FIG. 4 shows an improved battery module 10a. The battery module 10a does not have a current sensor. The battery module 10a and the battery module 10 have similar parts.

The battery module 10a includes a plurality of battery cells 13, a Battery Management System (BMS) 15 with two protection MOSFETs 17 and 20.

The first current sense terminal 42 of the BMS 15 is electrically connected to a source terminal of the protection MOSFET 17 while the second current sense terminal 45 of the BMS 15 is electrically connected to a drain terminal of the protection MOSFET 17.

The gate terminal of the protection MOSFET 17 is electrically connected to a gate driver terminal 47-1 of the BMS 15.

In use, the MOSFETs 17 and 20 also acts as circuit breakers for protecting the battery cells 13 against over-voltage, under-voltage, and over-current.

In addition, the MOSFET 17 also acts a current sensor resistor, which allows the BMS 15 to measure an electrical current that flows through the battery cells 13.

In detail, the MOSFET 17 behaves as a resistor when the MOSFET 17 is operating in its linear region, which is described below.

Figure 5:
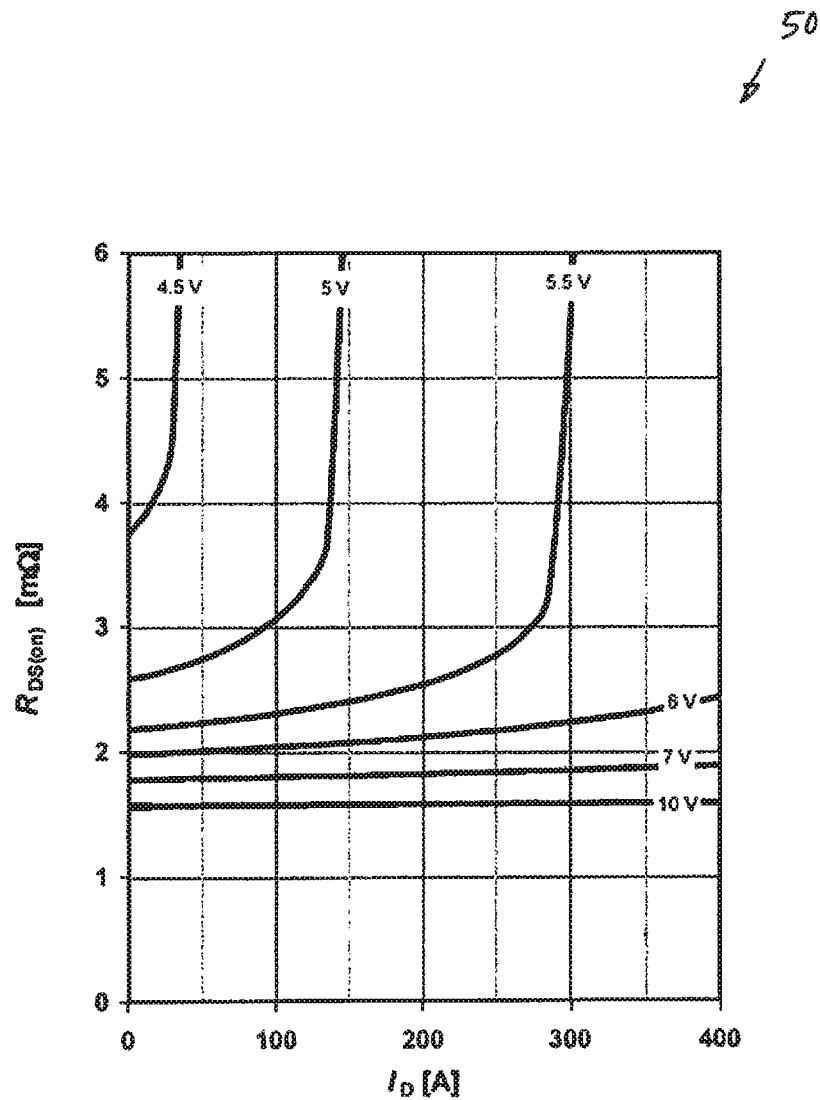
FIG. 5 illustrates a graph of an on-resistance of the protection MOSFET of FIG. 4.

FIG. 5 shows a graph 50 of an on-resistance of the MOSFET 17 of the battery module 10a. The MOSFET 17 operates in its linear region and has a near constant resistance value of around 1.5 milliohm, when its gate voltage is at about 10 volts. This resistance value is within an operating range of a sensor resistance of a BMS, the operating range extends between one and five milliohms.

Put differently, in this linear state, when an electrical current flows through the MOSFET 17 via the source terminal S1 and via the drain terminal D1 of the MOSFET 17, the MOSFET 17 behaves like a resistor.

In the battery-discharging mode, referring to FIG. 4, an electrical current that flows from the battery cells 13, to the drain terminal D1, and to the source terminal S1 of the MOSFET 17.

This electrical current then generates a potential difference between the source terminal S1 and the drain terminal D1 of the MOSFET 17.

The first current sense terminal 42 and the second current sense terminal 45 of the BMS 15 then receive this potential difference respectively from the source terminal S1 and the drain terminal D1 of the MOSFET 17.

After this, the BMS 15 measures the potential difference between the first current sense terminal 42 and the second current sense terminal 45. The BMS 15 later computes an electrical current that flows through the battery cells 13, according to the measured potential difference between the first current sense terminal 42 and the second current sense terminal 45.

The BMS 15 later compares the computed electrical current against a pre-determined over-current value to determine whether an over-current of the battery cells 13 has occurred.

The battery module 10a provides a benefit of reducing electrical power consumption. This is because MOSFET 17 acts as both circuit breaker and current sensor resistor, thereby reducing number of component. Electrical current from the battery cell 13 flows directly through the circuit breaker and through the current sensor resistor. Hence, the reduction of components also causes a reduction of energy consumption, which is important especially for portable devices.

Figure 6:
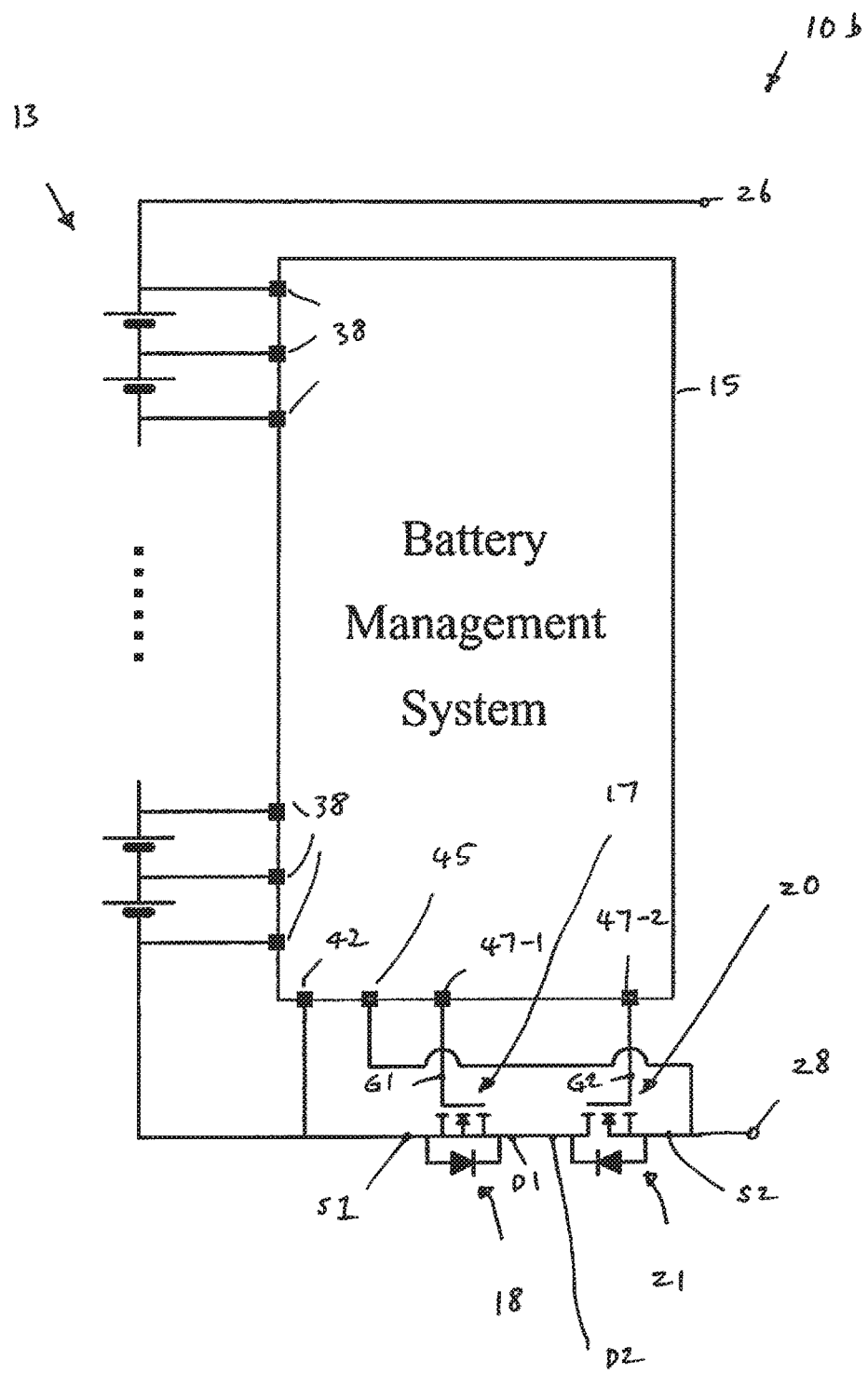
FIG. 6 illustrates a further improved battery module that includes a Battery Management System (BMS) with two protection MOSFETs, the two protection MOSFET also acts as a current sensor resistor.

FIG. 6 shows a further improved battery module 10b. The battery module 10b and the battery module 10 have similar parts.

The battery module 10b includes a Battery Management System (BMS) 15 with two protection MOSFETs 17 and 20. The two protection MOSFETs 17 and 20 also acts as a current sensor resistor.

The first current sense terminal 42 of the BMS 15 is connected to a source terminal of the protection MOSFET 17 while the second current sense terminal 45 of the BMS 15 is connected to a drain terminal of the protection MOSFET 17.

The MOSFET 17 has a gate terminal G1, a drain terminal D1, and a source terminal S1. Similarly, the MOSFET 20 has a gate terminal G2, a drain terminal D2, and a source terminal S2.

The source terminal S1 is electrically connected to a first current sense terminal 42 of the BMS 15. while the source terminal S2 is electrically connected to a second current sense terminal 45 of the BMS 15.

In detail, the gate terminal G1 is electrically connected to a gate driver terminal 47-1 of the BMS 15. The source terminal S1 is electrically connected to the first current sense terminal 42 and to an anode A1 of the diode 18. The drain terminal D1 is electrically connected to a cathode C1 of the diode 18.

The gate terminal G2 is electrically connected to a gate driver terminal 47-2 of the BMS 15. The drain terminal D2 is electrically connected to the drain terminal D1 of the MOSFET 17 and to a cathode C2 of the diode 21. The source terminal S2 is electrically connected to the second current sense terminal 45, to a load terminal 28 and to an anode A2 of the diode 21.

In use, the MOSFETs 17 and 20 also acts as circuit breakers for protecting the battery cells 13 against overvoltage, under-voltage, and over-current.

In detail, in the battery-discharging mode, an electrical current flows through the diode 21 and the MOSFET 17, wherein both the diode 21 and the MOSFET 17 act as a current sensor resistor.

In the battery-charging mode, an electrical current flows through the diode 18 and the MOSFET 20, wherein both the diode 18 and the MOSFET 20 act as a current sensor resistor.

Figure 7:
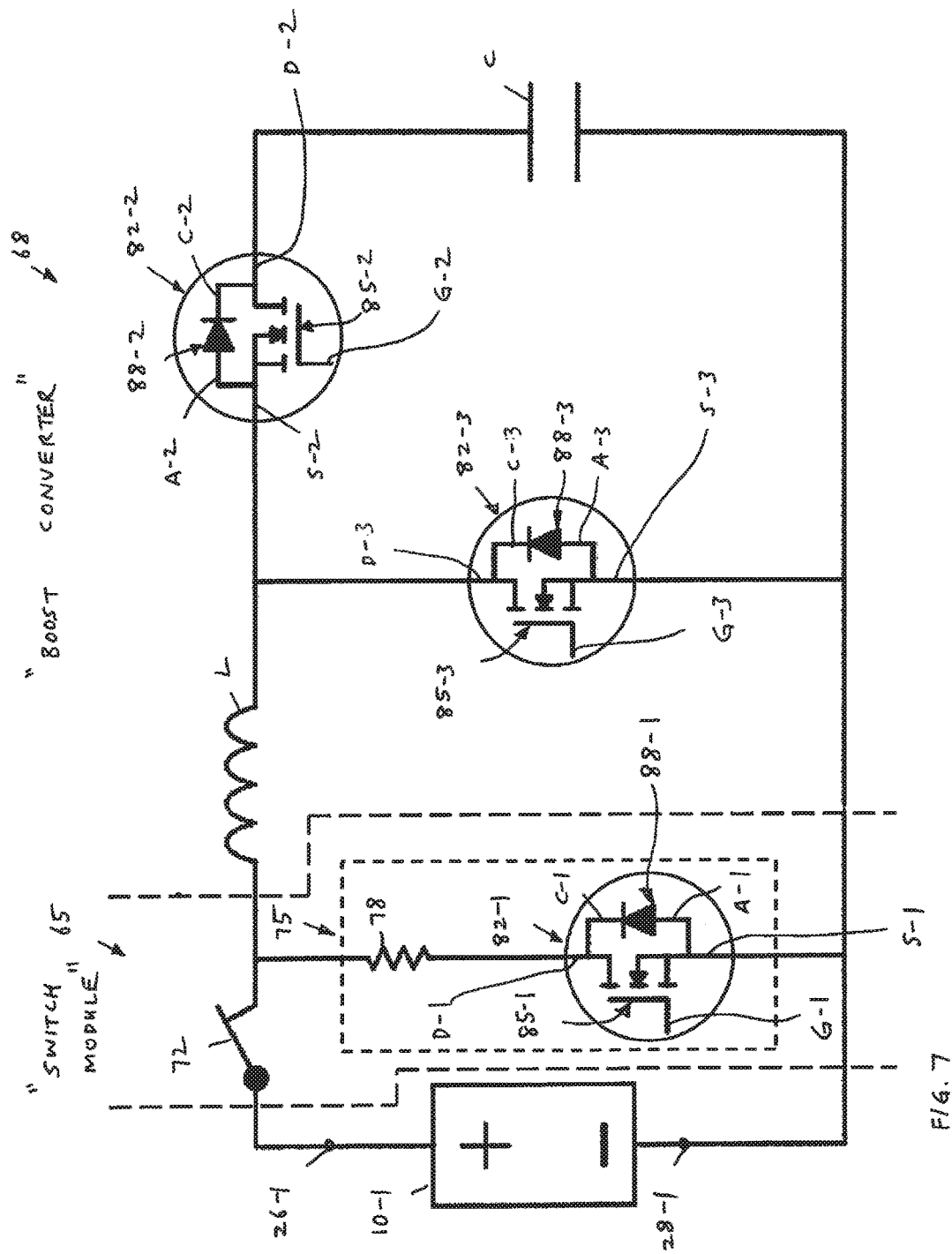
FIG. 7 illustrates an improved battery charger with a power switch protection unit.

FIG. 7 shows an improved battery charger 60 with a switch protector protection unit.

The battery charger 60 includes a battery module 10-1, a power-supply switch module 65, and a boost Converter 68. The battery module 10-1 is electrically connected to the boost Converter 68 through the power-supply switch module 65.

Referring to the battery module 10-1, it has two output power-supply terminals, namely a positive voltage terminal 26-1 and a negative voltage terminal 28-1.

Referring to the power-supply switch module 65, it comprises a power supply switch 72 with a switch protection unit 75. The switch protection unit 75 includes a resistor 78, and a switch unit 82-1.

In particular, a first terminal of the switch 72 is electrically connected to the positive voltage terminal 26-1. A second terminal of the switch 72 is electrically connected to a first node of the resistor 78.

A second node of the resistor 78 is electrically connected to a first terminal of the switch unit 82-1. A second terminal the switch unit 82-1 is electrically connected to the negative voltage terminal 28-1.

The switch unit 82-1 includes a MOSFET 85-1 with a body diode 88-1. The diode 88-1 includes an anode A-1 and a cathode C-1 while the MOSFET 85-1 includes a gate terminal G-1, a source terminal S-1, and a drain terminal D-1.

The anode A-1 of the diode 88-1 is electrically connected to the source terminal S-1 of the MOSFET 85-1. The cathode C-1 of the diode 88-1 is electrically connected to the drain terminal D-1 of the MOSFET 85-1. The gate-terminal G-1 is electrically connected to a MOSFET control unit of a Battery Management System (BMS).

Moreover, the drain terminal D-1 of the MOSFET 85-1 is electrically connected to the second terminal of the resistor 78. The source terminal S-2 of the MOSFET 85-1 is electrically connected to the negative voltage terminal 28-1.

Referring to the boost Converter 68, it comprises an inductor L, two switch units 82-2 and 82-3, and a capacitor C.

A first terminal of the inductor L is electrically connected to the second terminal of the switch 72. A second terminal of the inductor L is electrically connected to a first terminal of the switch unit 82-3. A second terminal of the switch unit 82-3 is electrically connected to the negative voltage terminal 28-1.

In detail, the switch units 82-3 and 82-1 have similar parts.

The switch unit 82-3 includes a MOSFET 85-3 and a body diode 88-3. The diode 88-3 includes an anode A-3 and a cathode C-3. The MOSFET 85-3 includes a gate terminal G-3, a source terminal S-3, and a drain terminal D-3.

The anode A-3 of the diode 88-3 is electrically connected to the source terminal S-3 of the MOSFET 85-3. The cathode C-3 of the diode 88-3 is electrically connected to the drain terminal D-3 of the MOSFET 85-3. The gate-terminal G-3 is electrically connected to a MOSFET control unit of the BMS.

The cathode C-3 is electrically connected to the second terminal of the inductor L. The source terminal S-3 is electrically connected to the negative voltage terminal 28-1.

Regarding the switch units 82-2 and 82-1, they also have similar parts.

The switch unit 82-2 includes a MOSFET 85-2 and a body diode 88-2. The diode 88-2 includes an anode A-2 and a cathode C-2. The MOSFET 85-2 includes a gate terminal G-2, a source terminal S-2, and a drain terminal D-2.

The anode A-2 of the diode 88-2 is electrically connected to the source terminal S-2 of the MOSFET 85-2. The cathode C-2 of the diode 88-2 is electrically connected to the drain terminal D-2 of the MOSFET 85-2. The gate-terminal G-2 is electrically connected to a MOSFET control unit of the BMS.

The source terminal S-2 is electrically connected to the second terminal of the inductor L. The drain terminal D-2 is electrically connected to a first terminal of the capacitor C.

A second terminal of the capacitor C is electrically connected to the negative voltage terminal 28-1.

In use, the power supply switch 72 provides a closed state and an open state.

In the closed state, the two terminals of the switch 72 are electrically shorted. The electrical resistance across these two terminals is essentially zero.

In the open state, the two terminals of the switch 72 are electrically open. The electrical resistance across these two terminals is essentially very large, such that electrical current cannot travel across these two terminals.

Referring to the boost Converter 68, it acts for transforming a direct current of one voltage level to another voltage level.

The inductor L Stores energy, which is the form of a magnetic field.

The capacitor C stores energy, which in the form of electric charges.

Operationally, the battery charger 60 provides different modes, namely a battery-discharging mode and a battery-charging mode.

Figure 8:
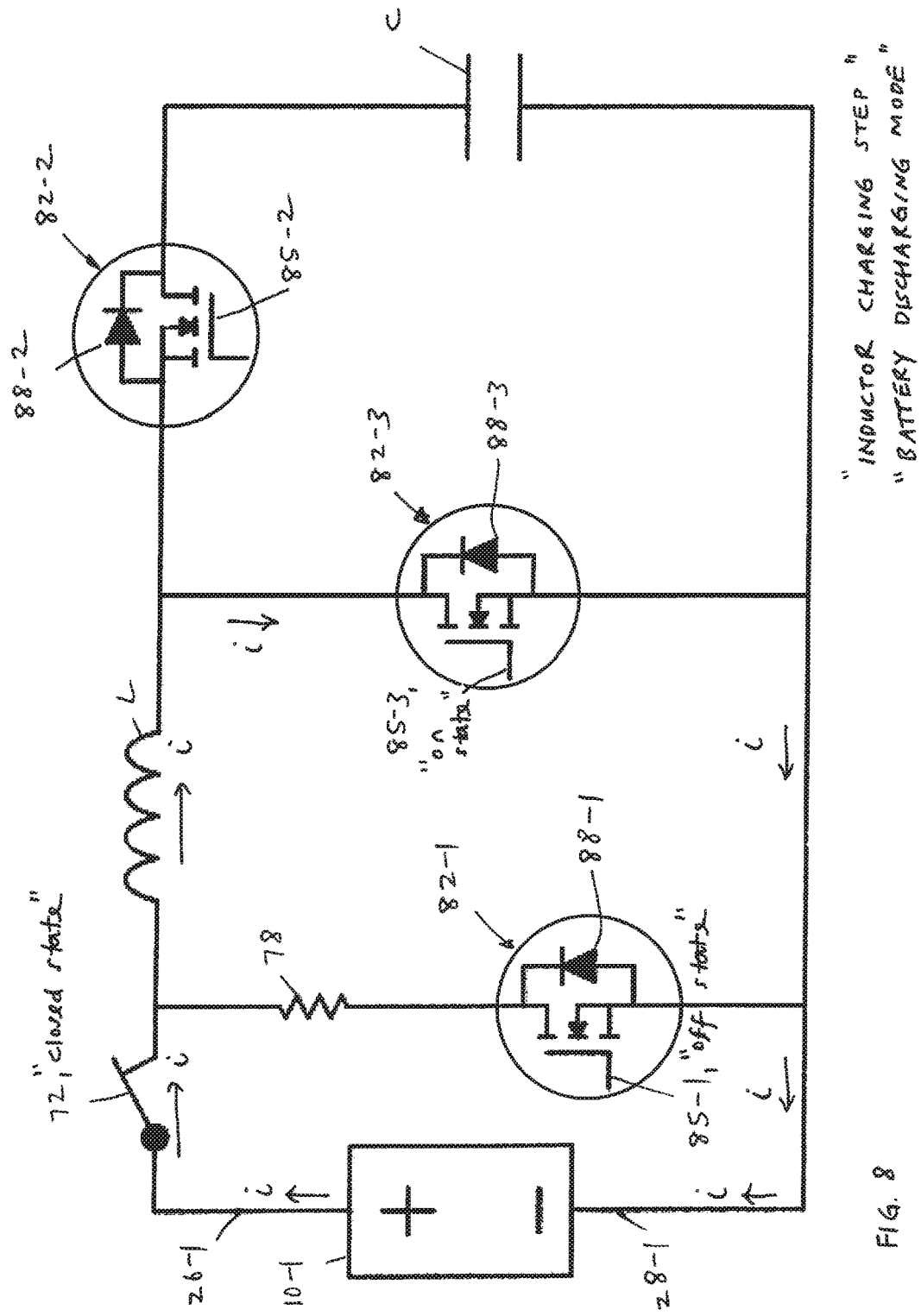
FIG. 8 illustrates the improved battery charger of FIG. 7, wherein the battery charger is in an inductor-charging step of a battery-discharging mode.
Figure 9:
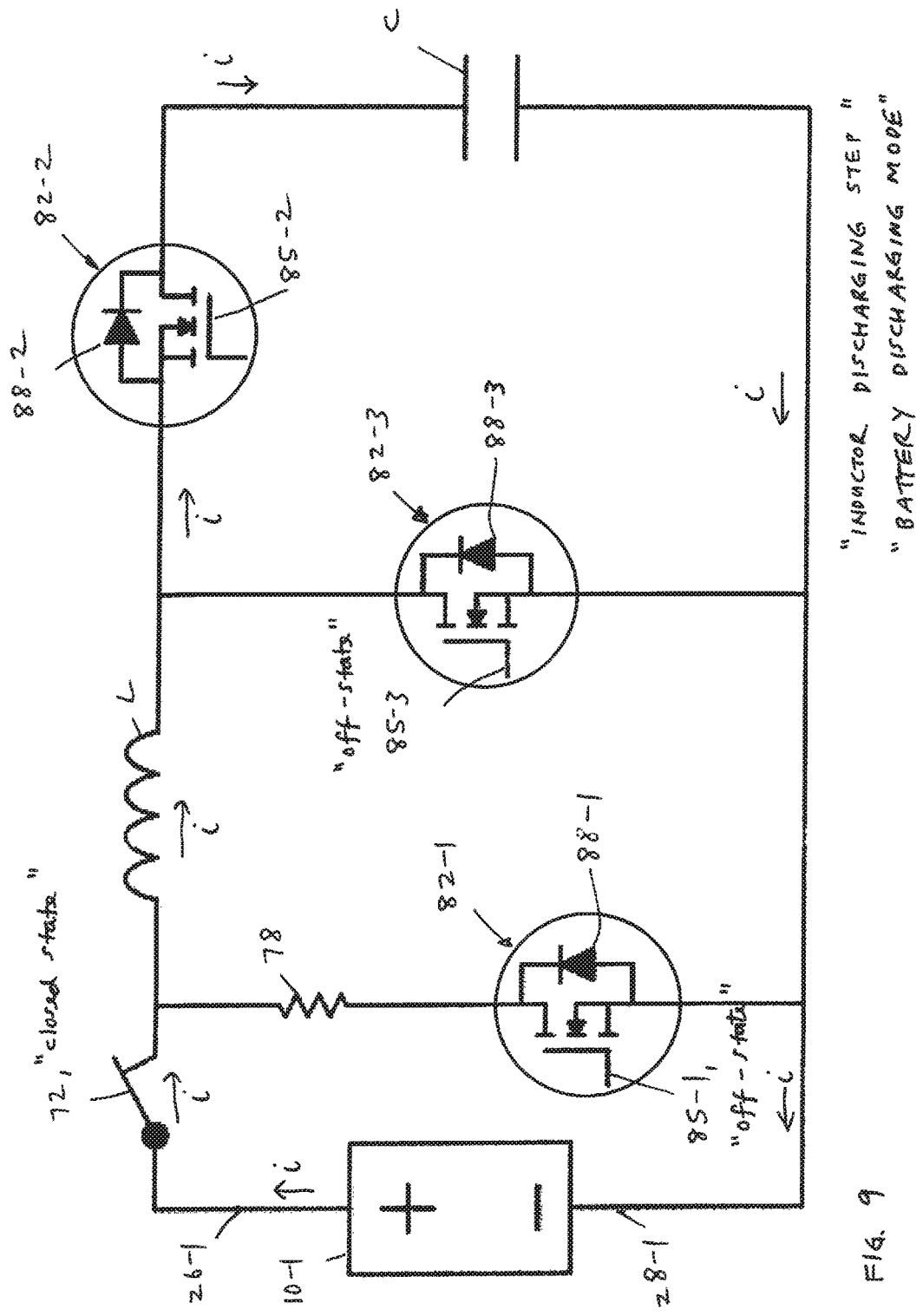
FIG. 9 illustrates the improved battery charger of FIG. 7, wherein the battery charger is in an inductor-discharging step of the battery-discharging mode.

FIGS. 8 and 9 show the improved battery charger 60, wherein the battery charger 60 is in the battery-discharging mode.

The battery-discharging mode comprises an inductor-charging step, which is shown in FIG. 8 and an inductor-discharging step, which is shown in FIG. 9.

In this inductor-charging step, the battery module 10-1 acts to transfer energy to the inductor L.

The MOSFET 85-3 is placed in the on-state, the MOSFET 85-1 is placed in the off-state, and the switch 72 is placed in the closed state by a BMS.

An electrical current i then flows from the battery module 10-1, through the power supply switch 72, through the inductor L, and through the MOSFET 85-3. This acts to transfer energy from the battery module 10-1 to the magnetic field of the inductor L.

In this inductor-discharging step, the battery module 10-1 and the inductor L acts to transfer energy to the capacitor C.

The MOSFET 85-3 is placed in the off-state, the MOSFET 85-1 is placed in the off-state, and the switch 72 is placed in the closed state by the BMS.

An electrical current i then flows from the battery module 10-1, through the power supply switch 72, through the inductor L, through the diode 88-2, and to the capacitor C. This acts to transfer energy from the battery module 10-1 and energy from the magnetic field of the inductor L to the capacitor C.

Figure 10:
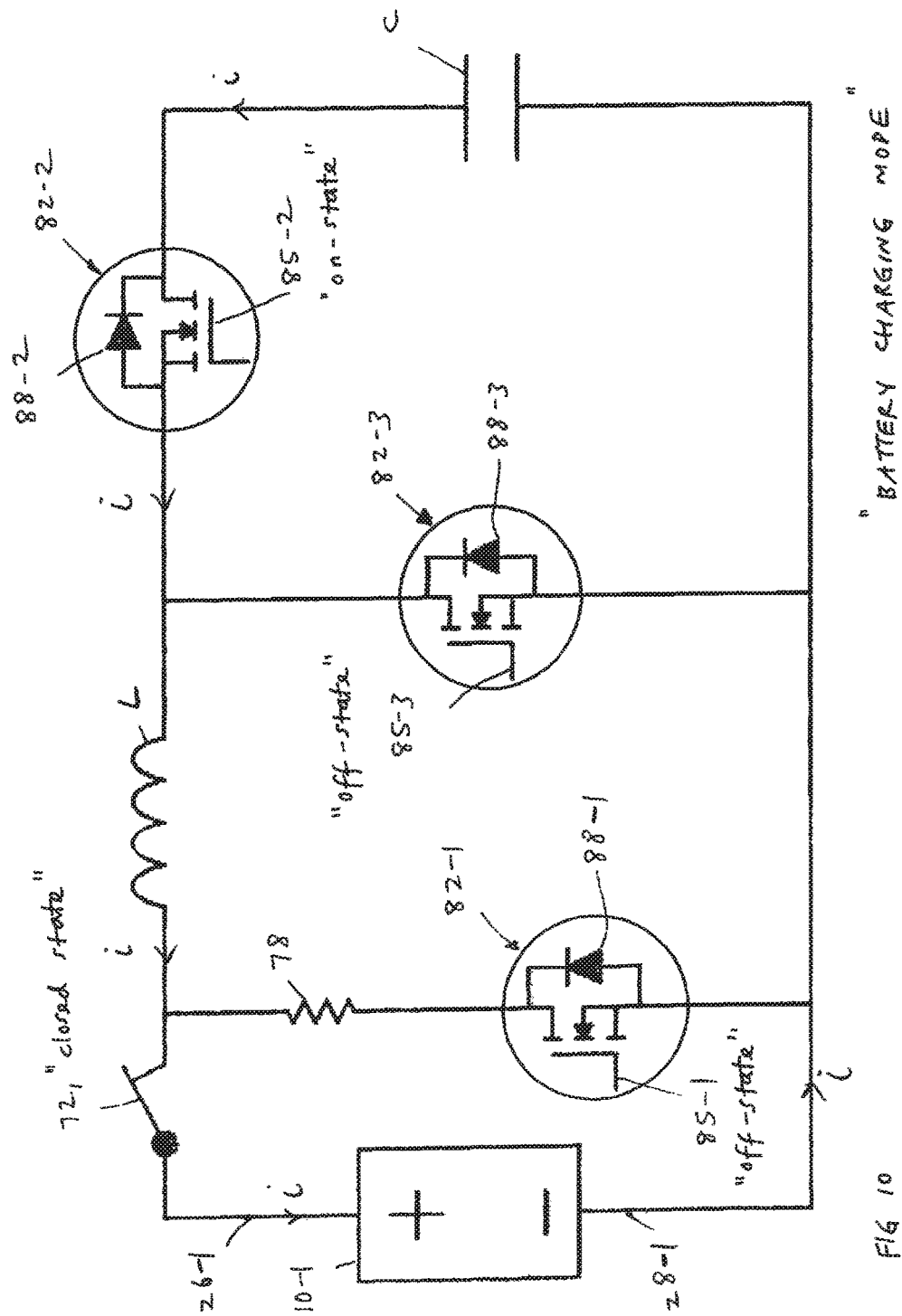
FIG. 10 illustrates the improved battery charger of FIG. 7, wherein the battery charger is in a battery-charging mode.

FIG. 10 shows the improved battery charger 60, wherein the battery charger 60 is in the battery-discharging mode.

In this battery-discharging mode, the capacitor C serves an energy source to transfer energy to the battery module 10-1.

The MOSFET 85-1 is placed in the off-state, the MOSFET 85-2 is placed in the on-state, the MOSFET 85-3 is placed in the off-state, and the switch 72 is placed in the closed state by the BMS.

An electrical current i then flows from the capacitor C, through the MOSFET 85-2, through the inductor L, through the switch 72, and to the battery module 10-1.

Figure 11:
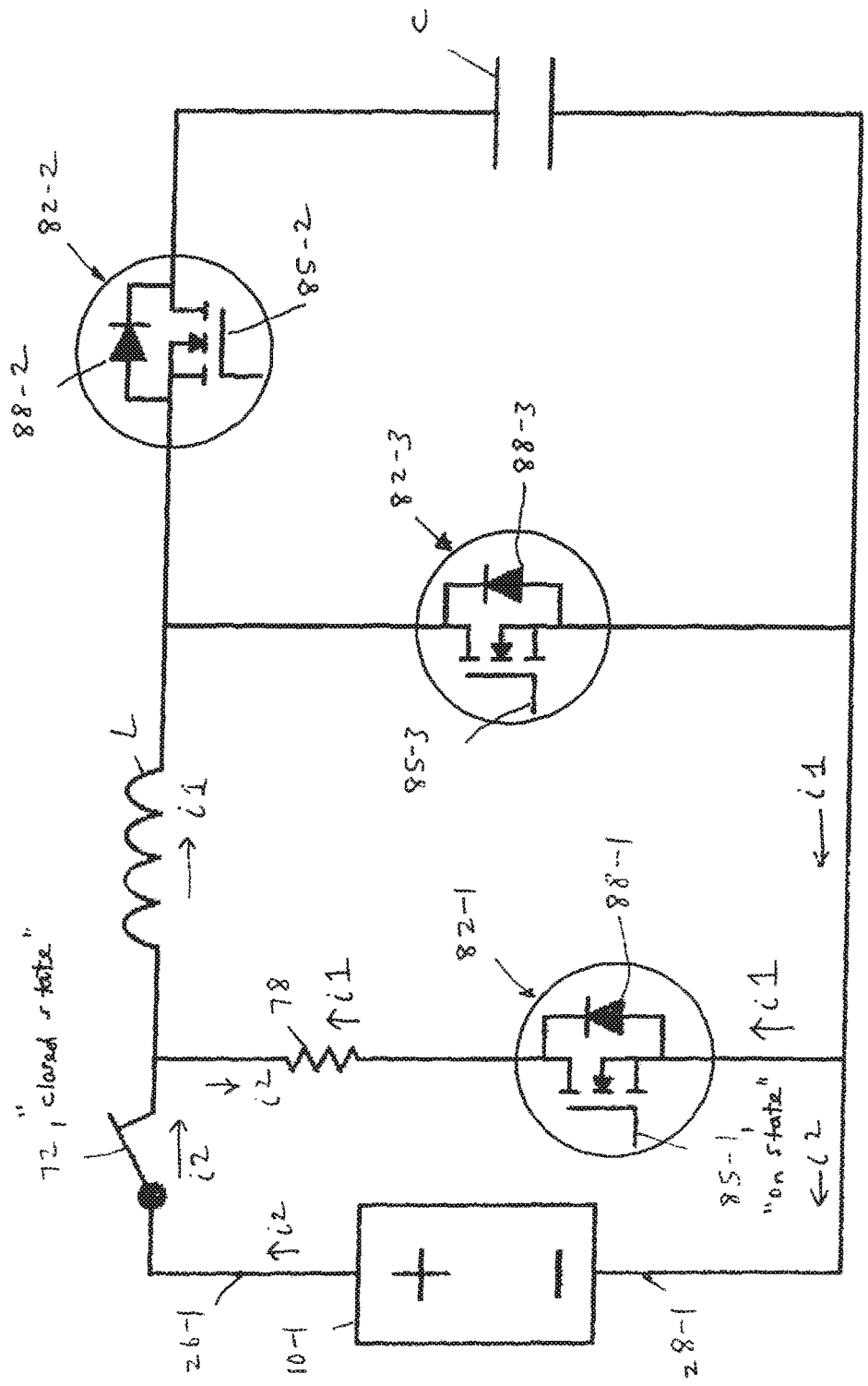
FIG. 11 illustrates the improved battery charger of FIG. 7, wherein the battery charger is in a first state of a power switch protection mode after a fault is detected.
Figure 12:
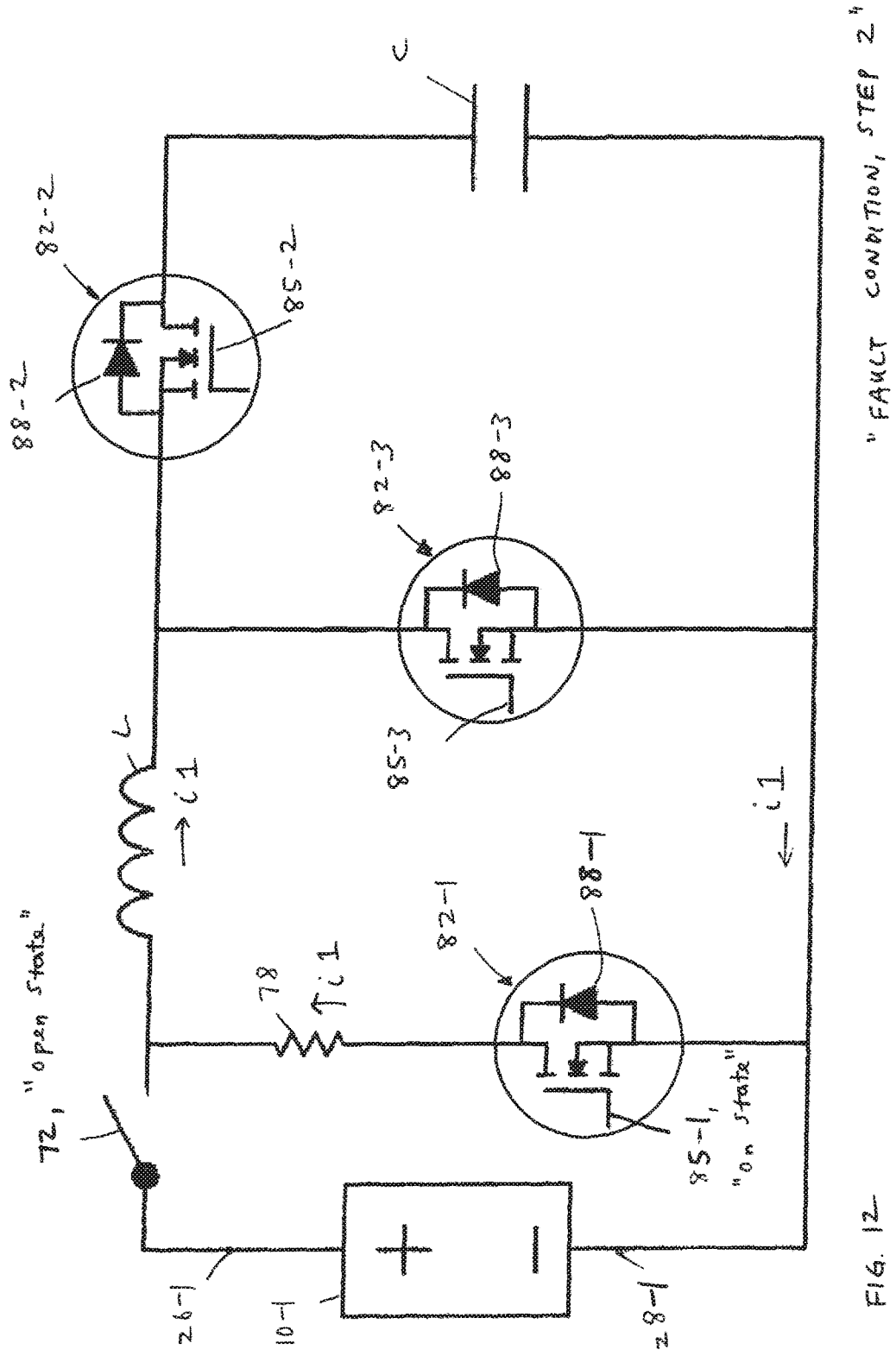
FIG. 12 illustrates the improved battery charger of FIG. 7, wherein the battery charger is in a second state of the power switch protection mode after a fault is detected.

FIGS. 11 and 12 show the improved battery charger 60, wherein the battery charger 60 is in a power switch protection mode.

The BMS places the battery charger 60 in the switch protection mode, after the BMS detects a fault. The fault can relate to an over-voltage, an under-voltage, or an over-current of the battery charger 60.

In the charging or the discharging mode, a large electrical current may be flowing from the battery module 10-1 to inductor L, through the power supply switch 72.

The switch protection mode acts to place the power supply switch 72 is placed in the open state without generating a large voltage spike. A break of flow of a large electrical current can generate a large voltage spike. This large voltage spike is to be avoided as it can damage the power switch 72.

The switch protection mode comprises a first step and a second step. The second step is performed after the first step.

In the first step of the switch protection mode, the power supply switch 72 remains in the closed state while the MOSFET 85-1 is placed in the on-state by the BMS, as shown in FIG. 11.

The battery module 10-1, the power supply switch 72, the resistor 78, and the MOSFET 85-1 form one closed electrical circuit loop. An electrical current i2 then flows from the battery module 10-1, through the power supply switch 72, through the resistor 78, and through the MOSFET 85-1. The resistance of the resistor 78 is configured such that this electrical current i2 is small.

At the same time, the inductor L, the diode 88-1, and the resistor 78 forms another closed electrical circuit loop. If the inductor L is energised, an electrical current i1, which may be large, flows from the inductor L, through the diode 88-1, and through the resistor 78. Depending on the state of the MOSFET 85-2, this electrical current i1 can flow through the diode 88-3 or flow through the MOSFET 85-2.

In the second step of the switch protection mode, the MOSFET 85-1 remains in the on state while the power supply switch 72 is placed in the open state by the BMS, as shown in FIG. 12.

This change of state of the power supply switch 72 causes a break of the flow of electrical current i2 through the power supply switch 72, which generates a small electrical spike, since only a small electrical current 12 is flowing through the power supply switch 72.

This causes the electrical current i1 in the inductor L to flow through the MOSFET 85-1, and through the resistor 78.

This flow of electrical current i1 causes energy of the inductor L to be dissipated by the resistor 78.

In this manner, the switch 72 is protected from damage caused by a large voltage spike.

Since the switch unit 82-1 and the resistor 78 are only used in this short transient mode, cheap devices can be used.

This is arrangement is different from other power supply that does have this circuit protection.

Figure 13:
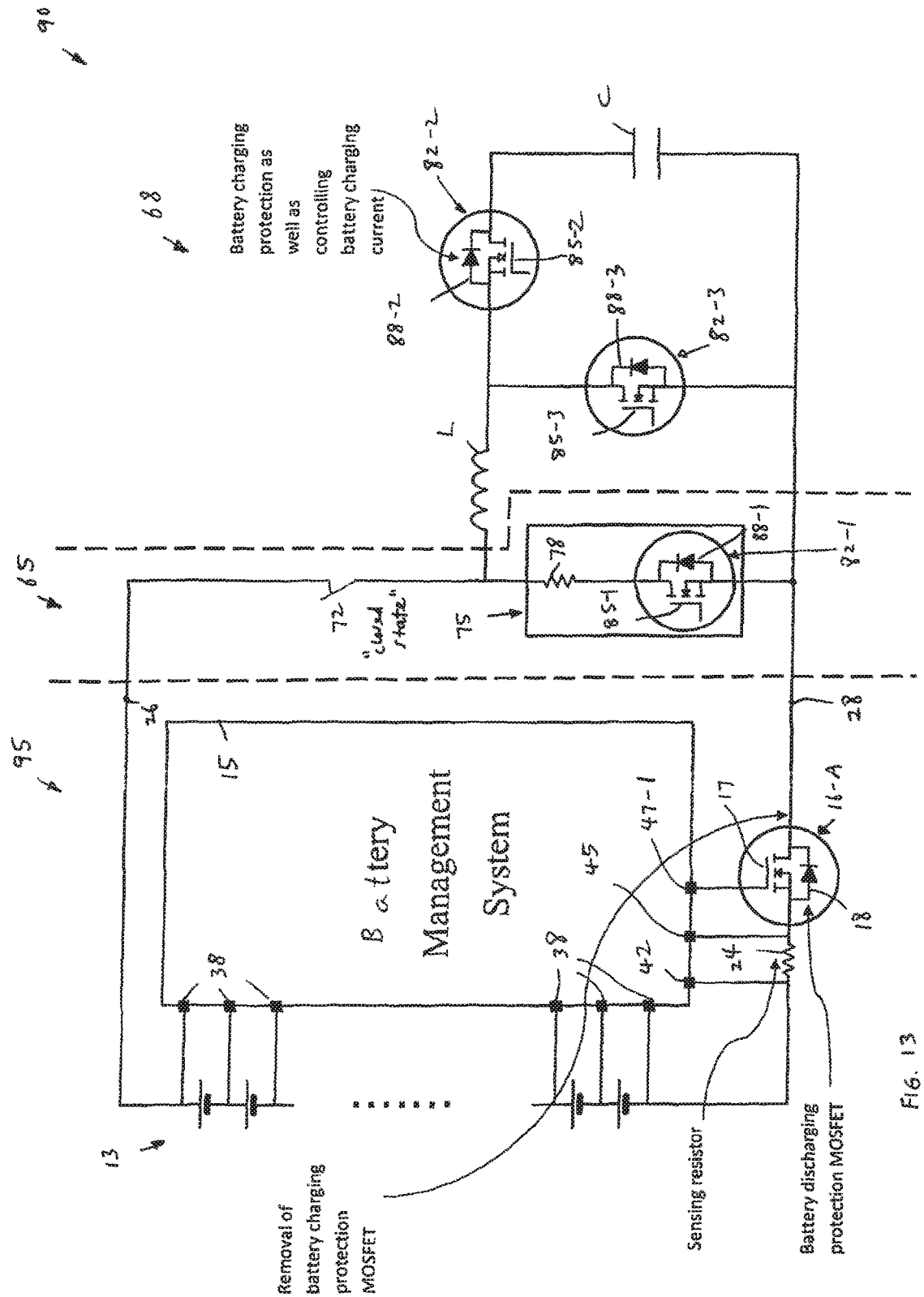
FIG. 13 illustrates a further improved battery charger that comprises a BMS and a boost Converter, the booster Converter also acts a battery-charging protection MOSFET for the BMS.

FIG. 13 shows an improved battery charger 90 with a booster converter also acts a battery-charging protection MOSFET.

The battery charger 90 includes a battery module 95, a power-supply switch module 65 of FIG. 7, and a boost Converter 68 of FIG. 7. The battery module 95 is electrically connected to the boost converter 68 through the power-supply switch module 65.

Referring to the battery module 95 includes a plurality of battery cells 13, a Battery Management System (BMS) 15, a circuit breaker 16-A, and a current sensor resistor 24.

The battery cells 13 are electrically connected to the current sensor resistor 24 and to the BMS 15. The current sensor resistor 24 is electrically connected to the circuit breaker 16-A, and to the BMS 15. The circuit breaker 16-A is electrically connected to the BMS 15.

In detail, the battery cells 13 are electrically connected in series. Each terminal of the battery cells 13 is electrically connected to a cell voltage terminal 38 of the BMS 15.

One end terminal of the battery cells 13 is electrically connected to a positive voltage terminal 26.

Referring to the sensor resistor 24, it has a first node and a second node. The first node is electrically connected to a first current sense terminal 42 of the BMS 15 and to another end terminal of the battery cells 13. The second node is electrically connected to a second current sense terminal 45 of the BMS 15.

Referring to the circuit breaker 16-A, it has a battery-discharging protection MOSFET 17 with a protection body diode 18.

The MOSFET 17 has a gate terminal, a drain terminal, and a source terminal. The gate terminal is electrically connected to a gate driver terminal 47-1 of the BMS 15. The source terminal is electrically connected to the second node of the sensor resistor 24 and is electrically connected to an anode of the diode 18. The drain terminal is electrically connected to a cathode of the diode 18 and to a negative voltage terminal 28.

Referring to the power-supply switch module 65, it comprises a power supply switch 72 with a switch protection unit 75. The switch protection unit 75 includes a resistor 78, and a switch unit 82-1.

In particular, a first terminal of the switch 72 is electrically connected to the positive voltage terminal 26. A second terminal of the switch 72 is electrically connected to a first node of the resistor 78.

A second node of the resistor 78 is electrically connected to a first terminal of the switch unit 82-1. A second terminal the switch unit 82-1 is electrically connected to the negative voltage terminal 28.

The switch unit 82-1 includes a MOSFET 85-1 with a body diode 88-1. The diode 88-1 includes an anode and a cathode while the MOSFET 85-1 includes a gate terminal, a source terminal, and a drain terminal.

The anode of the diode 88-1 is electrically connected to the source terminal of the MOSFET 85-1. The cathode of the diode 88-1 is electrically connected to the drain terminal of the MOSFET 85-1. The gate-terminal is electrically connected to a MOSFET control unit of the BMS 15.

Moreover, the drain terminal of the MOSFET 85-1 is electrically connected to the second terminal of the resistor 78. The source terminal of the MOSFET 85-1 is electrically connected to the negative voltage terminal 28.

Referring to the boost Converter 68, it comprises an inductor L, two switch units 82-2 and 82-3, and a capacitor C.

A first terminal of the inductor L is electrically connected to the second terminal of the switch 72. A second terminal of the inductor L is electrically connected to a first terminal of the switch unit 82-3. A second terminal of the switch unit 82-3 is electrically connected to the negative voltage terminal 28.

In detail, the switch units 82-3 and 82-1 have similar parts.

The switch unit 82-3 includes a MOSFET 85-3 and a body diode 88-3. The diode 88-3 includes an anode and a cathode. The MOSFET 85-3 includes a gate terminal, a source terminal, and a drain terminal.

The anode of the diode 88-3 is electrically connected to the source terminal of the MOSFET 85-3. The cathode of the diode 88-3 is electrically connected to the drain terminal of the MOSFET 85-3. The gate-terminal is electrically connected to a MOSFET control unit of the BMS.

The cathode of the diode 88-3 is electrically connected to the second terminal of the inductor L. The source terminal of the MOSFET 85-3 is electrically connected to the negative voltage terminal 28.

Regarding the switch units 82-2 and 82-1, they also have similar parts.

The switch unit 82-2 includes a MOSFET 85-2 and a body diode 88-2. The diode 88-2 includes an anode and a cathode. The MOSFET 85-2 includes a gate terminal, a source terminal, and a drain terminal.

The anode of the diode 88-2 is electrically connected to the source terminal of the MOSFET 85-2. The cathode of the diode 88-2 is electrically connected to the drain terminal of the MOSFET 85-2. The gate-terminal of the MOSFET 85-2 is electrically connected to a MOSFET control unit of the BMS.

The source terminal of the MOSFET 85-2 is electrically connected to the second terminal of the inductor L. The drain terminal of the MOSFET 85-2 is electrically connected to a first terminal of the capacitor C.

A second terminal of the capacitor C is electrically connected to the negative voltage terminal 28.

In use, the MOSFET 82-2 of the booster Converter 68 acts a battery-charging protection MOSFET.

The MOSFET 82-2 of the booster converter 68 acts a battery-discharging protection MOSFET.

The battery charger 90 provides different modes, namely a battery-discharging mode and a battery-charging mode.

Figure 14:
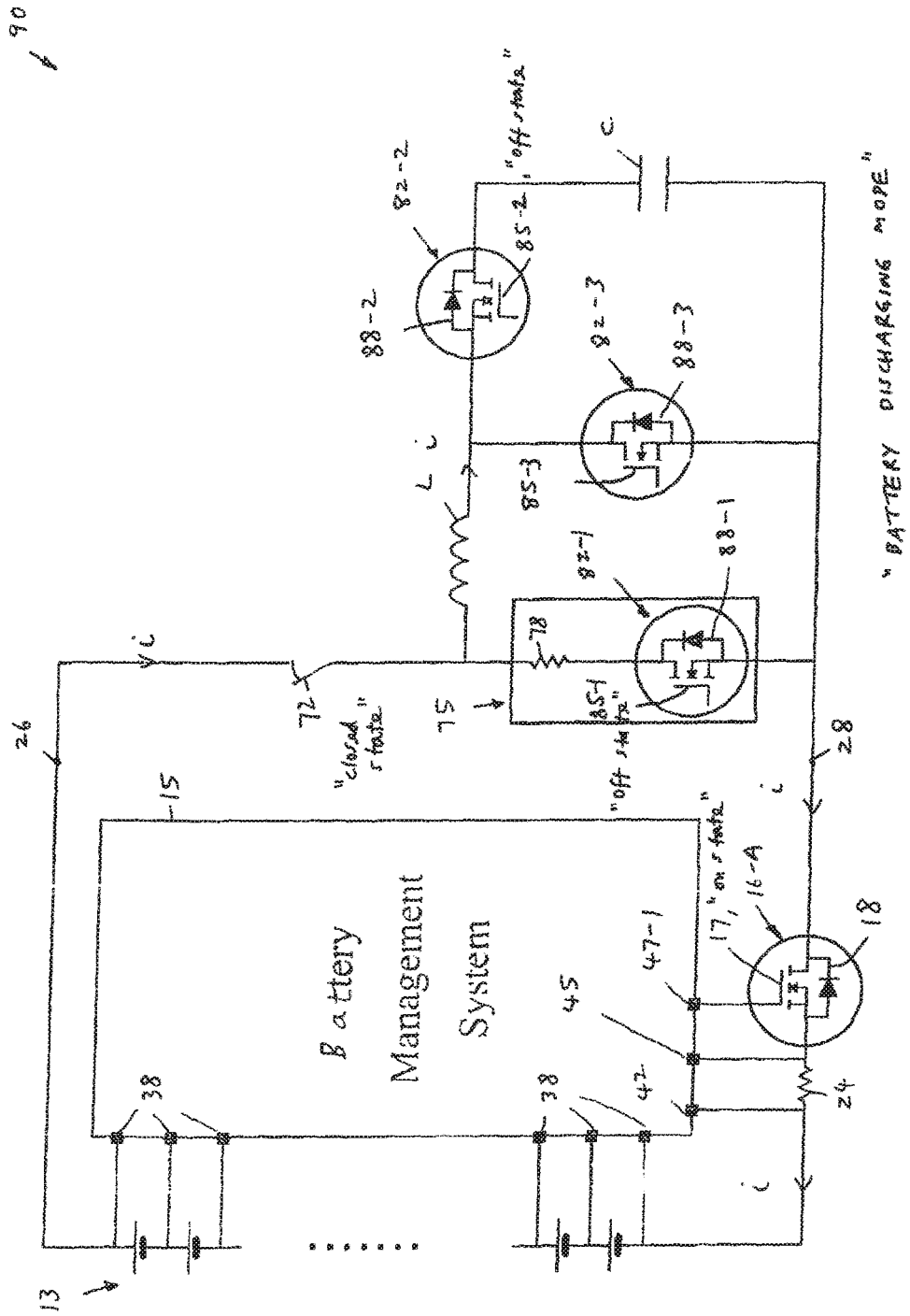
FIG. 14 illustrates the battery charger of FIG. 13, wherein the battery charger is in a battery-discharging mode.

FIG. 14 shows the battery charger 90, wherein the battery charger 90 is in the battery-discharging mode.

In this battery-discharging mode, the BMS 15 places the switch 72 in the closed state, the MOSFET 17 in the on-state, the MOSFET 85-1 in the off-state, and the MOSFET 85-2 in the off-state. The MOSFET 85-3 alternates between the on-state for energising the inductor L and the off-state for releasing the energy of the inductor L.

An electrical current i then flows from the battery cells 13, through the switch 72, through the inductor L, through MOSFET 85-2 when the MOSFET 85-2 is placed in the on-state, through the MOSFET 17, and through the current sensor resistor 24.

If the BMS 15 detects an over-voltage, or an under-voltage, or an over-current of the battery cells 13, the BMS 15 places the MOSFET 17 in the off-state. This then stops the flow of the electrical current i, which causes the over-voltage, or the under-voltage, or the over-current of the battery cells 13 to cease.

Figure 15:
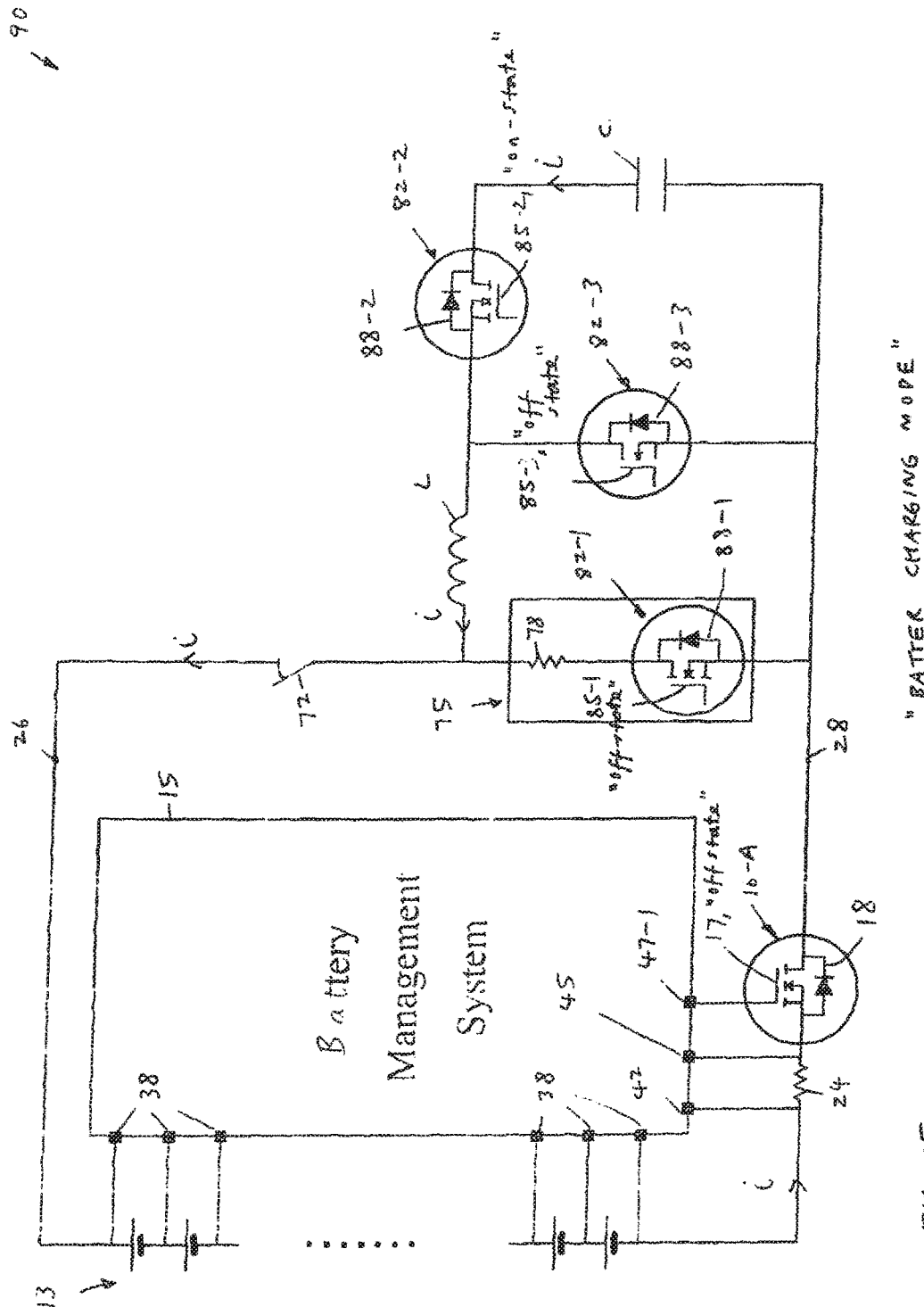
FIG. 15 illustrates the battery charger of FIG. 13, wherein the battery charger is in a battery-charging mode.

FIG. 15 shows the battery charger 90, wherein the battery charger 90 is in a battery-charging mode.

In this battery-charging mode, the BMS 15 places the switch 72 in the closed state, the MOSFET 17 in the off-state, the MOSFET 85-1 in the off-state, the MOSFET 85-2 in the on-state, and the MOSFET 85-3 in the off-state.

An electrical current i then flows from the capacitor C, through MOSFET 85-2, through the inductor L, through the switch 72, through the battery cells 13, through the current sensor resistor 24, and, through the diode 18.

If the BMS 15 detects an over-voltage or an over-current of the battery cells 13, the BMS 15 places the MOSFET 85-2 in the off-state. This then stops the flow of the electrical current i, thereby causing the over-voltage or the over-current of the battery cells 13 to cease.

This configuration of the battery charger 90 allows the battery module 95 to exclude a battery-charging protection MOSFET, since the MOSFET 85-2 of the boost converter 68 also acts as a battery-charging protection MOSFET.

Figure 16:
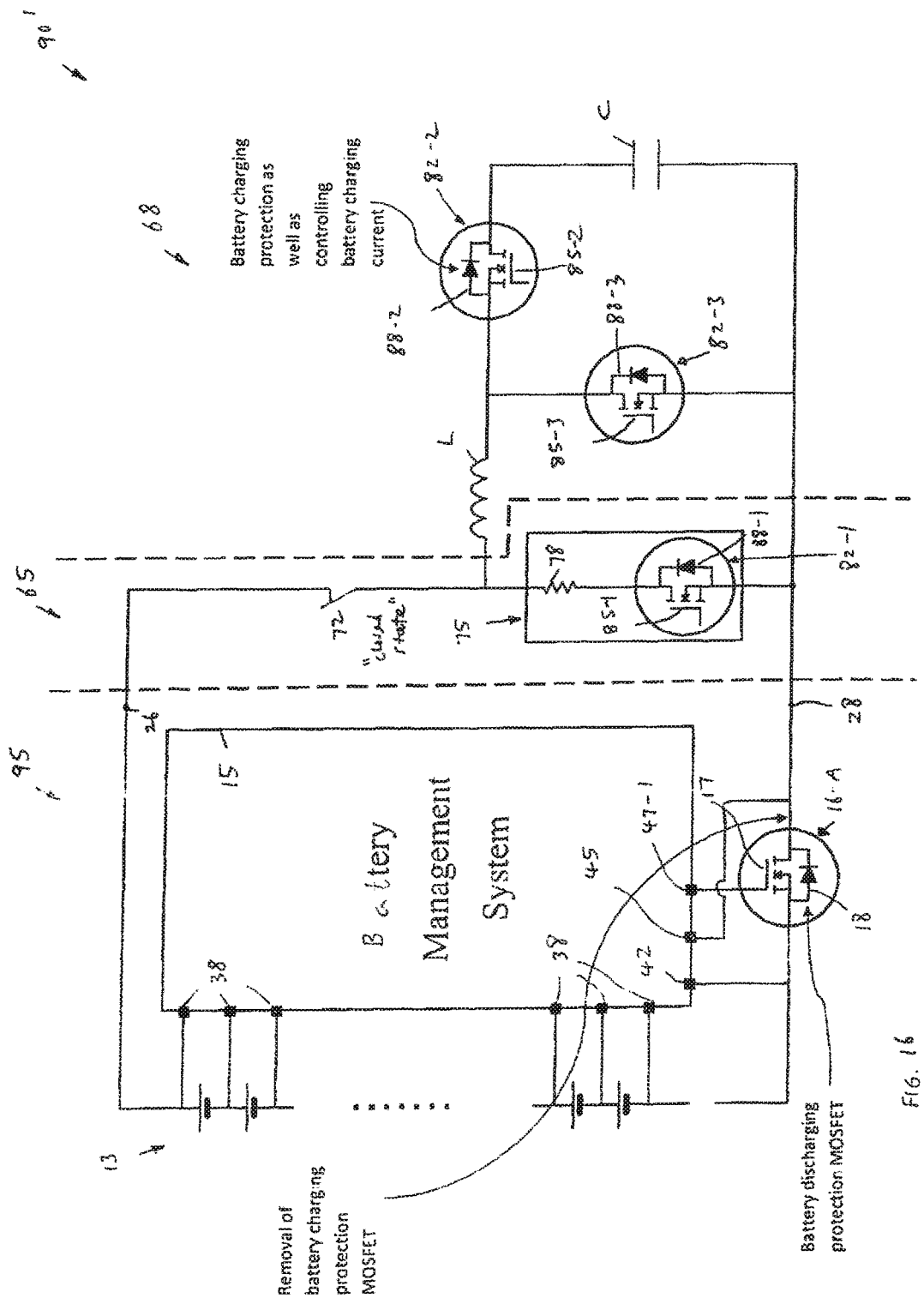
FIG. 16 illustrates a variant of the battery charger of FIG. 13.

FIG. 16 shows a variant of the battery charger of FIG. 13. FIG. 16 depicts a battery charger 90'. The battery chargers 90 and 90' have similar parts.

The current sensor resistor 24 is removed from the battery charger 90'. The first current sense terminal 42 of the BMS 15 is electrically connected to the anode of the diode 18. The second current sense terminal 45 of the BMS 15 is electrically connected to the cathode of the diode 18.

In use, the drain terminal and the source terminal of the MOSFET 17 act as terminals of the current sensor resistor 24.

This arrangement of the battery charger 90' serves to reduce component and save energy, since a separate component for acting as a current sensor resistor is not needed.

In summary, the embodiments show an improved battery module, wherein a switch also acts a current sensor resistor.

The battery module includes at least one battery unit, a transistor unit, and a battery management unit.

The battery unit acts a rechargeable energy storage unit. In a discharging mode, the energy storage unit provides a discharging power supply electrical current. In a charging mode, the energy storage unit receives a charging power supply electrical current.

The transistor unit acts a switch that includes a switch gate node, a first switch current node, and a second switch current node. The switch can act to allow a flow of electrical current across its first and second switch current nodes. The switch can also act to block the flow of electrical current across the first and the second switch current nodes.

The transistor unit is configured such that, when a predetermined transistor on-state voltage is applied to the gate node, the power supply electrical current from the battery unit is allowed to pass through the first switch current node and through the second switch current node.

When a predetermined transistor off-state voltage is applied to the gate node, the power supply electrical current is blocked from passing through the first switch current node and is blocked from passing through the second switch current node.

The battery management unit comprises a processor for managing the battery unit. The processor is electrically connected to a gate node control port, which is electrically connected to the switch gate node of the transistor unit.

The transistor unit further serves as an electrical current sensor resistor for the battery management unit. The battery management unit includes a first electrical current sensor resistor port and a second electrical current sensor resistor port. These ports are used to measure the electrical current from the battery unit.

The first electrical current sensor resistor port is electrically connected to the first switch current node and is electrically connected to the processor while the second electrical current sensor resistor port is electrically connected to the second switch current node and is electrically connected to the processor.

The processor is adapted to measure an electrical current according to a potential difference between the first electrical current sensor resistor port and the second electrical current sensor resistor port. This potential difference is the same as a potential difference between the first switch current node and the second switch current node.

After this, the processor compares the measured electrical current with a predetermined over-current value.

When the processor detects a deviation of the electrical current from the predetermined over-current value, which indicates an over-current of the battery unit, the processor sends and applies the predetermined transistor off-state voltage to the gate node.

This predetermined transistor off-state voltage acts to block the electrical current to the battery unit, thereby causing the battery unit over-current to cease.

The battery module provides an advantage of reducing components since the transistor unit serves as both a circuit breaker and a sensor resistor. The reduced components act to reduce cost and reduce energy consumption.

In one implementation, the transistor unit comprises a Metal-Oxide-Semiconductor Field-Effect Transistor (MOSFET). The MOSFET includes a gate terminal that acts as the switch gate node, a drain terminal that acts as the first switch current node, and a source terminal that acts as the second switch current node.

In one implementation, the transistor unit comprises a first MOSFET and a second MOSFET. The first MOSFET acts to regulate the flow electrical current in one direction while the second MOSFET acts to regulate the flow electrical current in another direction.

The first and the second MOSFETs together also act an electrical current sensor resistor for the battery management unit. In one mode of the battery module, a source terminal and a drain terminal of the first MOSFET together with a body diode of the second MOSFET act the electrical current sensor resistor. In another mode of the battery module, a body diode of the first MOSFET with and a source terminal and a drain terminal of the second MOSFET act the electrical current sensor resistor.

In detail, the first MOSFET includes a first gate terminal, a first source terminal, and a first drain terminal. Similarly, the second MOSFET includes a second gate terminal, a second source terminal, and a second drain terminal. The first drain terminal is electrically connected to the second drain terminal.

The first source terminal acts as the first switch current node of the transistor unit while the second source terminal acts as the second switch current node of the transistor unit.

The embodiments also show an improved battery module with a power switch protector.

The battery module includes at least one battery unit, a battery management unit, and a power supply switch.

In a discharging mode, the battery unit provides a power supply electrical current to an electrical load.

The battery management unit includes a processor for managing the battery unit.

The power supply switch is provided for receiving the power supply electrical current from the battery unit. The processor sets or determines a position of the power supply switch.

The battery module includes a distinguishing feature, which comprises a switch protection unit for protecting the power supply switch.

The switch protection unit includes a protection switch and a protection resistor.

The processor sets a position of the protection switch.

When the protection switch is in a closed position, the protection resistor is adapted to receive the power supply electrical current from the power supply switch.

The protection resistor is also adapted such that an amount of the power supply electrical current that flows through the protection resistor is less than a predetermined low value.

When the processor detects a fault, the processor is adapted to place the power supply switch in the open position after placing the protection switch in the closed position.

This arrangement allows a small current to pass through the power supply switch when this power supply switch is opened. This opening generates a small voltage spike, which does not damage the power supply switch.

The protection switch can include a transistor unit for easy implementation.

The transistor unit can also include a Metal-Oxide-Semiconductor Field-Effect Transistor (MOSFET), although the transistor unit can also include other types of transistor.

The embodiments also show an improved battery charger with a boost converter that comprises a discharging protection switch.

The battery charger includes a battery module and a boost converter.

The battery module includes at least one battery unit and a battery management unit, wherein the battery management unit that comprises a processor.

The boost converter includes an inductor unit, a first switch unit, and a second switch unit.

A first terminal of the inductor unit being provided for receiving a power electrical current from the battery unit.

A first terminal of the first switch unit is electrically connected to a second terminal of the inductor unit while a second terminal of the first switch unit is electrically connected to the battery module.

The second switch unit includes a diode, and a switch. An anode of the diode is electrically connected to the second terminal of the inductor unit. The processor sets a position of the switch. A first terminal of the switch is electrically connected to the anode of the diode and a second terminal of the switch is electrically connected to a cathode of the diode. The cathode of the diode is also provided for connecting an external energy storage unit.

The battery charger provides a battery-discharging mode, and a battery-charging mode.

In the battery-discharging mode, the battery unit provides a discharging power supply electrical current for sending to the energy storage unit.

In the battery-charging mode, the processor sets the switch to a closed position and the battery unit receives a charging power supply electrical current from the energy storage unit.

When a fault is detected, the processor sets the switch to an open position, thereby protecting the battery unit from damage.

The protection switch can include a transistor unit.

The transistor unit can include a MOSFET.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments is non-limiting.

REFERENCE NUMBERS 10 battery module
10a battery module
10b battery module
10c battery module
10-1 battery module
13 plurality of battery cells
15 Battery Management System (BMS)
16 circuit breaker
16-A circuit breaker
17 protection MOSFET
18 diode
20 protection MOSFET
21 diode
24 current sensor resistor
25a node
25b node
26 first load terminal
26-1 positive voltage terminal
28 second load terminal
28-1 negative voltage terminal
30 first end battery cell
33 intermediate battery cell
36 second end battery cell
38 cell voltage terminal
42 first current sense terminal
45 second current sense terminal
47-1 gate driver terminal
47-2 gate driver terminal
50 graph
55 switch
60 battery charger
65 power-supply switch module
68 boost Converter
72 power supply switch
75 switch protection unit
78 resistor
82-1 switch unit
82-2 switch unit
82-3 switch unit
85-1 MOSFET
85-2 MOSFET
85-3 MOSFET
88-1 diode
88-2 diode
88-3 diode
90 battery charger
90' battery charger
95 battery module
C capacitor
i electrical current
l electrical load
L inductor
V electrical power source
A1 anode
A-1 anode
A2 anode
A-2 anode
A-3 anode
C1 cathode
C2 cathode
C-1 cathode
C-2 cathode
C-3 cathode
D drain terminal
D-1 drain terminal
D2 drain terminal
D-2 drain terminal
D-3 drain terminal
G1 gate terminal G2 gate terminal
G-1 gate terminal
G-2 gate terminal
G-3 gate terminal
S1 source terminal
S-1 source terminal
S2 source terminal
S-2 source terminal
S-3 source terminal

The invention claimed is:

1. A battery module, comprising:
at least one battery unit for providing a power supply electrical current;
a transistor unit for serving as a switch for the at least one battery unit; and
a battery management unit that includes a processor, a first electrical current sensor resistor port, and a second electrical current sensor resistor port;
wherein:
the transistor unit includes a switch gate node, a first switch current node, and a second switch current node; and
the transistor unit is provided such that:
the power supply electrical current passes through the first switch current node and the second switch current node when a predetermined transistor on-state voltage is applied to the switch gate node; and
the power supply electrical current is blocked from passing through the first switch current node and the second switch current node when a predetermined transistor off-state voltage is applied to the switch gate node; and
the processor is connected to the switch gate node;
the transistor unit further serves as an electrical current sensor;
the first electrical current sensor resistor port is connected to the first switch current node;
the second electrical current sensor resistor port is connected to the second switch current node; and
the processor is adapted to:
measure an electrical current according to a potential difference between the first electrical current sensor resistor port and the second electrical current sensor resistor port;
compare the measured electrical current with a predetermined over-current value; and
send the predetermined transistor off-state voltage to the switch gate node in response to a result of the comparison being that there is a deviation of the electrical current from the predetermined over-current value.

2. The battery module according to claim 1, wherein the transistor unit includes a Metal-Oxide-Semiconductor Field-Effect Transistor (MOSFET) that includes a gate terminal that acts as the switch gate node, a drain terminal that acts as the first switch current node, and a source terminal that acts as the second switch current node.

3. The battery module according to claim 1, wherein:
the transistor unit includes:
a first MOSFET that includes a first gate terminal, a first source terminal, and a first drain terminal; and
a second MOSFET that includes a second gate terminal, a second source terminal, and a second drain terminal;
the first drain terminal is connected to the second drain terminal;
the first source terminal acts as the first switch current node; and
the second source terminal acts as the second switch current node.

4. A battery module, comprising:
at least one battery unit for providing a power supply electrical current;
a power supply switch for receiving the power supply electrical current;
a switch protection unit for protecting the power supply switch and including:
a protection switch; and
a protection resistor, wherein, when the protection switch is in a closed position, the protection resistor is adapted to receive the power supply electrical current from the power supply switch, and wherein the protection resistor is adapted such that an amount of the power supply electrical current that flows through the protection resistor is less than a predetermined low value; and
a battery management unit that includes a processor, wherein the processor is adapted to:
place the protection switch in the closed position; and
place the power supply switch in an open position after the placing of the protection switch in the closed position.

5. The battery module according to claim 4, wherein the protection switch includes a transistor unit.

6. The battery module according to claim 5, wherein the transistor unit includes a Metal-Oxide-Semiconductor Field-Effect Transistor (MOSFET).

7. A battery charger, comprising:
a battery module that includes:
at least one battery unit; and
a battery management unit that comprises a processor; and
a boost Converter that includes:
an inductor unit that includes a first terminal for receiving a power electrical current from the at least one battery unit
a first switch unit that includes:
a first terminal connected to a second terminal of the inductor unit; and
a second terminal connected to the battery module; and
a second switch unit that includes a diode and a switch;
wherein:
an anode of the diode is connected to the second terminal of the inductor unit;
a first terminal of the switch is connected to the anode of the diode;
a second terminal of the switch is connected to a cathode of the diode;
the cathode of the diode is provided for connecting an energy storage unit;
the processor is configured to:
in a battery-discharging mode, set the switch to an open position;
in a battery-charging mode, set the switch to a closed position; and
when a fault is detected, set the switch to the open position; and
the battery unit is configured to:
in the battery-discharging mode, provide a discharging power supply electrical current for sending to the energy storage unit; and in the battery-charging mode, receive a charging power supply electrical current from the energy storage unit.

8. The battery charger according to claim 7, wherein the protection switch includes a transistor unit.

9. The battery charger according to claim 8, wherein the transistor unit includes a Metal-Oxide-Semiconductor Field-Effect Transistor (MOSFET).

\* \* \* \* \*